US008407994B2

(12) United States Patent
Kamoshida et al.

(10) Patent No.: US 8,407,994 B2
(45) Date of Patent: Apr. 2, 2013

(54) ROTATION CONTROL SYSTEM FOR WORKING-MACHINE PUMP

(75) Inventors: Yasuhiro Kamoshida, Chikusei (JP); Kyouji Uranaka, Yokohama (JP); Masaru Shizume, Mooka (JP)

(73) Assignee: Komatsu Ltd., Tochigi (JP)

( * ) Notice: Subject to any disclaimer, the term of this patent is extended or adjusted under 35 U.S.C. 154(b) by 815 days.

(21) Appl. No.: 12/529,835

(22) PCT Filed: Feb. 21, 2008

(86) PCT No.: PCT/JP2008/052964

§ 371 (c)(1), (2), (4) Date: Sep. 3, 2009

(87) PCT Pub. No.: WO2008/108180

PCT Pub. Date: Sep. 12, 2008

(65) Prior Publication Data

US 2010/0058752 A1 Mar. 11, 2010

(30) Foreign Application Priority Data

Mar. 8, 2007 (JP) ................................ 2007-058883

(51) Int. Cl.
*F16D 31/02* (2006.01)

(52) U.S. Cl. ........................................................ 60/431

(58) Field of Classification Search .................... 60/431, 60/459, 432, 403; 417/42; 298/22 C
See application file for complete search history.

(56) References Cited

U.S. PATENT DOCUMENTS

| | | | | |
|---|---|---|---|---|
| 1,223,741 | A * | 4/1917 | Schwister | 60/432 |
| 3,021,177 | A * | 2/1962 | Gresko | 298/22 C |
| 4,505,111 | A * | 3/1985 | Okamoto et al. | 60/431 |
| 4,723,409 | A * | 2/1988 | Kuhn | 60/422 |
| 6,951,067 | B1 * | 10/2005 | Dietz et al. | 37/348 |
| 6,988,363 | B2 * | 1/2006 | Bitter | 60/468 |
| 7,082,758 | B2 * | 8/2006 | Kageyama et al. | 60/445 |

FOREIGN PATENT DOCUMENTS

| | | |
|---|---|---|
| JP | 50-25162 | 8/1975 |
| JP | 56-135575 A | 10/1981 |
| JP | 57-13295 A | 1/1982 |
| JP | 63-150484 A | 6/1988 |
| JP | 64-29299 U | 2/1989 |

(Continued)

OTHER PUBLICATIONS

International Preliminary Report on Patentability and Written Opinion of the International Searching Authority dated Sep. 29, 2009 (8 pages), issued in counterpart International application No. PCT/JP2008/052964.

*Primary Examiner* — Edward Look
*Assistant Examiner* — Michael Quandt
(74) *Attorney, Agent, or Firm* — Holtz, Holtz, Goodman & Chick, P.C.

(57) ABSTRACT

A rotation control system of a hoist pump includes: the hoist pump (3); an engine (2) for driving the hoist pump (3); a working equipment driven by a hydraulic cylinder that is extendable by hydraulic oil delivered through the hoist pump (3); a hydraulic oil tank that stores the hydraulic oil supplied to the hoist pump (3) and receives the hydraulic oil returned from the hydraulic cylinder; and a controller (9) that controls a rotation speed of the hoist pump (3) to be an allowable rotation speed that is set in advance for preventing cavitation while the hydraulic cylinder is operated.

6 Claims, 19 Drawing Sheets

FOREIGN PATENT DOCUMENTS

| | | | | |
|---|---|---|---|---|
| JP | 2-57703 | A | | 2/1990 |
| JP | 7-52701 | A | | 2/1995 |
| JP | 2002-276610 | | * | 9/2002 |
| JP | 2002-276610 | A | | 9/2002 |
| JP | 2006-112288 | | * | 4/2006 |
| JP | 2006-112288 | A | | 4/2006 |

* cited by examiner

ROTATION CONTROL SYSTEM FOR WORKING-MACHINE PUMP

This application is a U.S. National Phase Application under 35 USC 371 of International Application PCT/JP2008/052964 filed Feb. 21, 2008.

TECHNICAL FIELD

The present invention relates to a rotation control system of a hoist pump, and more particularly to a rotation control system of a hoist pump of a dump truck.

BACKGROUND ART

In a traditional dump truck, a vehicle body and a body (also referred to as a hoist or vessel) are connected via a hydraulic hoist cylinder. The body is lifted up and down by extending and retracting the hoist cylinder. The hoist cylinder is extendable by changing a flow of hydraulic oil supplied from a hoist pump using a hoist valve (Patent Document 1).

When a large amount of hydraulic oil is supplied to the bottom of the hoist cylinder in order to move the body upwardly, an amount of oil supply considerably exceeds an amount of oil returned to a hydraulic oil tank. Accordingly, an oil level is suddenly lowered in the hydraulic oil tank, so that inner pressure within the hydraulic oil tank is considerably lowered. Thus, suction pressure within the hoist pump is also considerably lowered, so that cavitation may occur in the hoist pump to damage the hoist pump. Especially at high altitude, the pressure within the hydraulic oil tank is remarkably lowered since atmospheric pressure is lowered.

Thus, to prevent cavitation, in some instances, the inside of the hydraulic oil tank may be pressurized in advance by a breather, or air may be delivered into the hydraulic oil tank from an air source such as a compressor to pressurize the inside of the hydraulic oil tank in advance so as to supplement the predicted decrease in the inner pressure within the hydraulic oil tank.

Patent Document 1: JP-A-7-52701

DISCLOSURE OF THE INVENTION

Problems to be Solved by the Invention

However, since the hydraulic oil tank is excessively strained when the pressure is applied to the hydraulic oil tank by the breather or compressor, it is required to reinforce the hydraulic oil tank. Thus, the structure may be complicated. Also, when the breather is used, the pressure of the breather may be set each time the altitude of a workplace is changed, which requires cumbersome efforts. Further, high production cost and maintenance cost are required to provide the air source such as the compressor only for applying pressure to the hydraulic oil tank.

An object of the invention is to provide a rotation control system of a hoist pump that can prevent cavitation in the hoist pump at low cost and without troublesome work, in which a hydraulic tank having a simple arrangement can be used.

Means for Solving the Problems

According to an aspect of the invention, a rotation control system of a hoist pump includes: the hoist pump: an engine that drives the hoist pump; a working equipment driven by a hydraulic cylinder that is extended and retracted by hydraulic oil delivered through the hoist pump; a hydraulic oil tank that stores the hydraulic oil supplied to the hoist pump and receives the hydraulic oil returned from the hydraulic cylinder; and a controller that controls a rotation speed of the hoist pump to be an allowable rotation speed that is set in advance for preventing cavitation when the hydraulic cylinder is operated.

According to the aspect of the invention, the controller controls the hoist pump to work at the allowable rotation speed to prevent cavitation when the hydraulic cylinder is operated. Consequently, the cavitation in the hoist pump can be reliably prevented. Thus, it is not required that the inside of the hydraulic oil tank is pressurized in advance by a breather or air is delivered into the hydraulic oil tank from an air source such as a compressor to pressurize the inside of the hydraulic oil tank as is conventional. Accordingly, it is not required to reinforce the hydraulic oil tank. In addition, the pressure of the breather does not need to be changed. Further, the air source such as the compressor is not required, which leads to cost reduction. Thus, an object of the invention can be achieved.

The rotation control system of the hoist pump according to the aspect of the invention preferably includes a potentiometer that measures an operation position of the working equipment, in which the controller preferably includes: an engine speed calculator that calculates an engine speed in accordance with the allowable rotation speed of the hoist pump determined based on a position measurement signal outputted from the potentiometer; and a fuel injection quantity controller that controls a fuel injection quantity in accordance with the engine speed calculated by the engine speed calculator.

According to the aspect of the invention, the operation position of the working equipment is consecutively measured by the potentiometer. By setting a proper allowable rotation speed in accordance with the operation position, the rotation speed can be precisely controlled and work efficiency of the working equipment can be enhanced. For example, when the hydraulic cylinder is extended and the working equipment is started to work, the hydraulic oil is supplied to the hydraulic cylinder and therefore an oil level within the hydraulic oil tank is lowered. Accordingly, the suction pressure of the hoist pump is gradually lowered, so that cavitation easily occurs. On the other hand, when the hydraulic cylinder is retracted and the working equipment is returned to its original position, the oil level within the hydraulic oil tank is raised, so that the suction pressure in the working equipment is gradually restored. In other words, since the suction pressure is varied depending on the position of the working equipment, the hoist pump is controlled at a relatively high speed when the working equipment is at a position where the suction pressure is sufficiently large. Conversely, the hoist pump is controlled at a low speed when the working equipment is at a position where the suction pressure is low. Thus, the working equipment can favorably work, which leads to improvement of work efficiency.

The rotation control system of the hoist pump according the aspect of the invention preferably includes a working equipment lever that extends and retracts the hydraulic cylinder to operate the working equipment. The controller preferably includes: a signal receiver that receives an operation signal from the working equipment lever; an engine speed calculator that calculates an engine speed in accordance with the allowable rotation speed of the hoist pump determined based on the operation signal outputted from the signal receiver; and a fuel injection quantity controller that controls a fuel injection quantity in accordance with the engine speed calculated by the engine speed calculator.

The rotation control system of the hoist pump according to the aspect of the invention preferably includes a position sensor that detects whether the working equipment is in a predetermined position or not. The controller preferably includes: a signal receiver that receives a detection signal from the position sensor; an engine speed calculator that calculates an engine speed in accordance with the allowable rotation speed of the hoist pump determined based on the detection signal outputted from the signal receiver; and a fuel injection quantity controller that controls a fuel injection quantity in accordance with the engine speed calculated by the engine speed calculator.

According to the aspect of the invention, an operation condition of the working equipment lever is monitored, or whether the working equipment is in the predetermined position or not is detected by the position sensor. Thus, the operation of the hydraulic cylinder can be reliably recognized by receiving the signals from the working equipment lever and position sensor in a simple way.

The rotation control system of the hoist pump according to the aspect of the invention preferably includes an oil level sensor that measures an oil level in the hydraulic tank. The controller preferably includes: an engine speed calculator that calculates an engine speed in accordance with the allowable rotation speed of the hoist pump determined based on an oil level measurement signal outputted from the oil level sensor; and a fuel injection quantity controller that controls a fuel injection quantity in accordance with the engine speed calculated by the engine speed calculator.

According to the aspect of the invention, by measuring an oil level in the hydraulic oil tank, suction pressure can be calculated and then an allowable rotation speed can be determined based on the calculated suction pressure without providing the suction pressure sensor or discharge pressure sensor.

The rotation control system of the hoist pump according to the aspect of the invention preferably includes a discharge pressure sensor that measures a discharge pressure of the hoist pump. The controller preferably includes: a signal receiver that receives a discharge pressure measurement signal from the discharge pressure sensor; an engine speed calculator that calculates an engine speed in accordance with the allowable rotation speed of the hoist pump determined based on the discharge pressure measurement signal outputted from the signal receiver; and a fuel injection quantity controller that controls a fuel injection quantity in accordance with the engine speed calculated by the engine speed calculator.

The rotation control system of the hoist pump according to the aspect of the invention preferably includes a suction pressure sensor that measures a suction pressure in the hoist pump, in which the controller preferably includes: a signal receiver that receives a suction pressure measurement signal from the suction pressure sensor; an engine speed calculator that calculates an engine speed in accordance with the allowable rotation speed of the hoist pump determined based on the suction pressure measurement signal outputted from the signal receiver; and a fuel injection quantity controller that controls a fuel injection quantity in accordance with the engine speed calculated by the engine speed calculator.

According to the aspect of the invention, the discharge pressure and suction pressure can be directly measured since the discharge pressure sensor and the suction pressure sensor are respectively provided on a discharge part and a suction part of the hoist pump. Thus, cavitation can be reliably prevented. Especially, because the occurrence of the cavitation is directly related to the suction pressure, reliability of the system can be remarkably enhanced by directly detecting the suction pressure. For example, when the hydraulic cylinder is extended and the working equipment is started to work, the discharge pressure in the hoist pump may be temporarily increased and the suction pressure may be decreased, so that cavitation may easily occur. Even in such a case, an allowable rotation speed can be reliably determined in accordance with the pressure variation by directly measuring the discharge pressure and suction pressure.

The rotation control system of the hoist pump according to the aspect of the invention preferably includes an atmospheric pressure sensor that measures an atmospheric pressure and/or an oil temperature sensor that measures a temperature of the hydraulic oil, in which the controller determines the allowable rotation speed based on the atmospheric pressure measured by the atmospheric pressure sensor and/or the temperature measured by the oil temperature sensor.

According to the aspect of the invention, the controller determines the allowable rotation speed of the hoist pump based on the change in the atmospheric pressure and hydraulic oil temperature. Thus, the rotation speed can be more precisely controlled.

Figure 1:
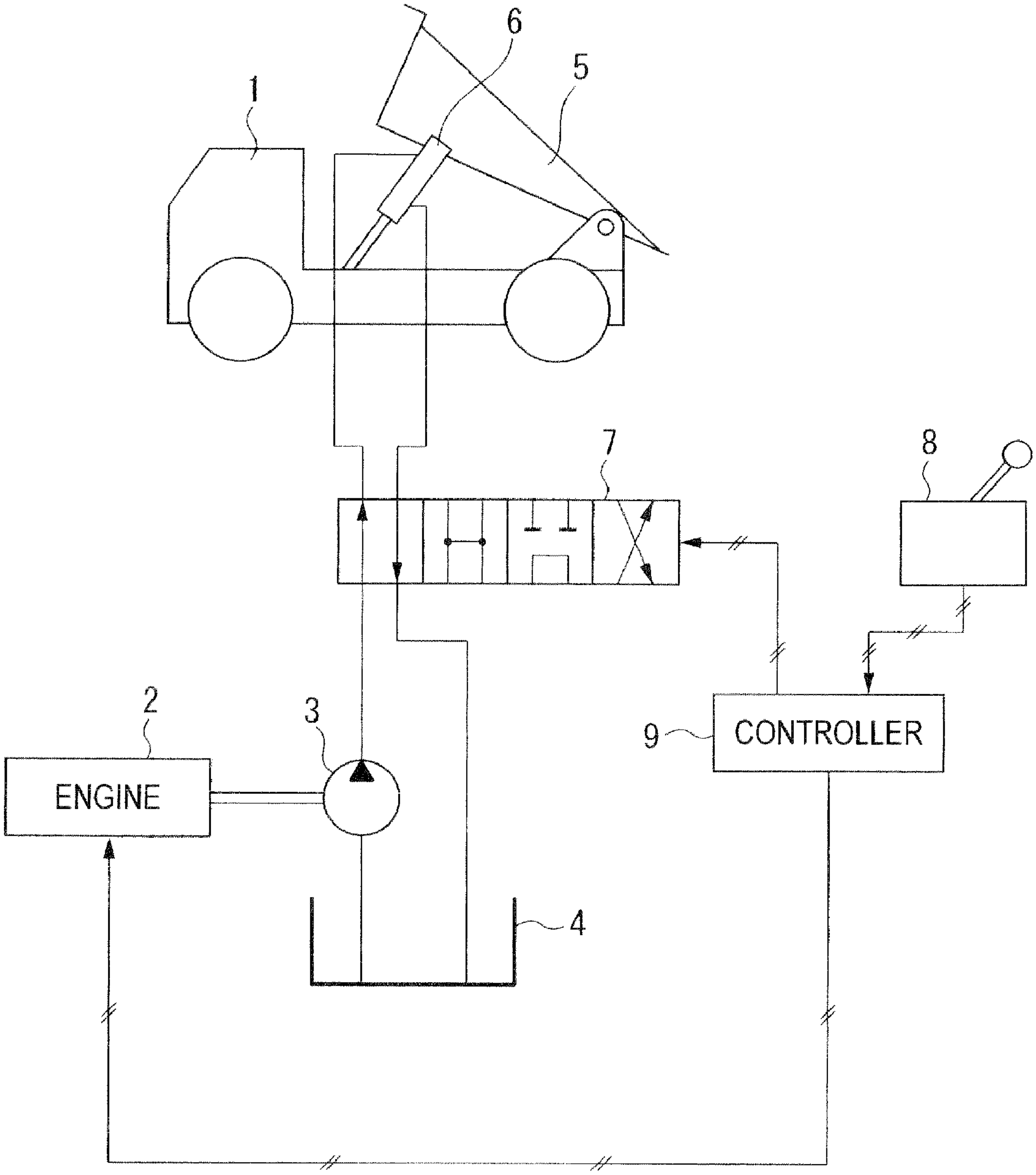
FIG. 1 schematically shows a hydraulic circuit of a rotation control system of a hoist pump according to a first exemplary embodiment of the invention.

Exemplary embodiment(s) of the invention will be described below with reference to the attached drawings. It should be noted that, in a second exemplary embodiment to a sixth exemplary embodiment as described below, the same reference numerals will be used for the components which are the same as those of a first exemplary embodiment, and the detailed description thereof will be simplified or omitted.

FIRST EXEMPLARY EMBODIMENT

Figure 2:
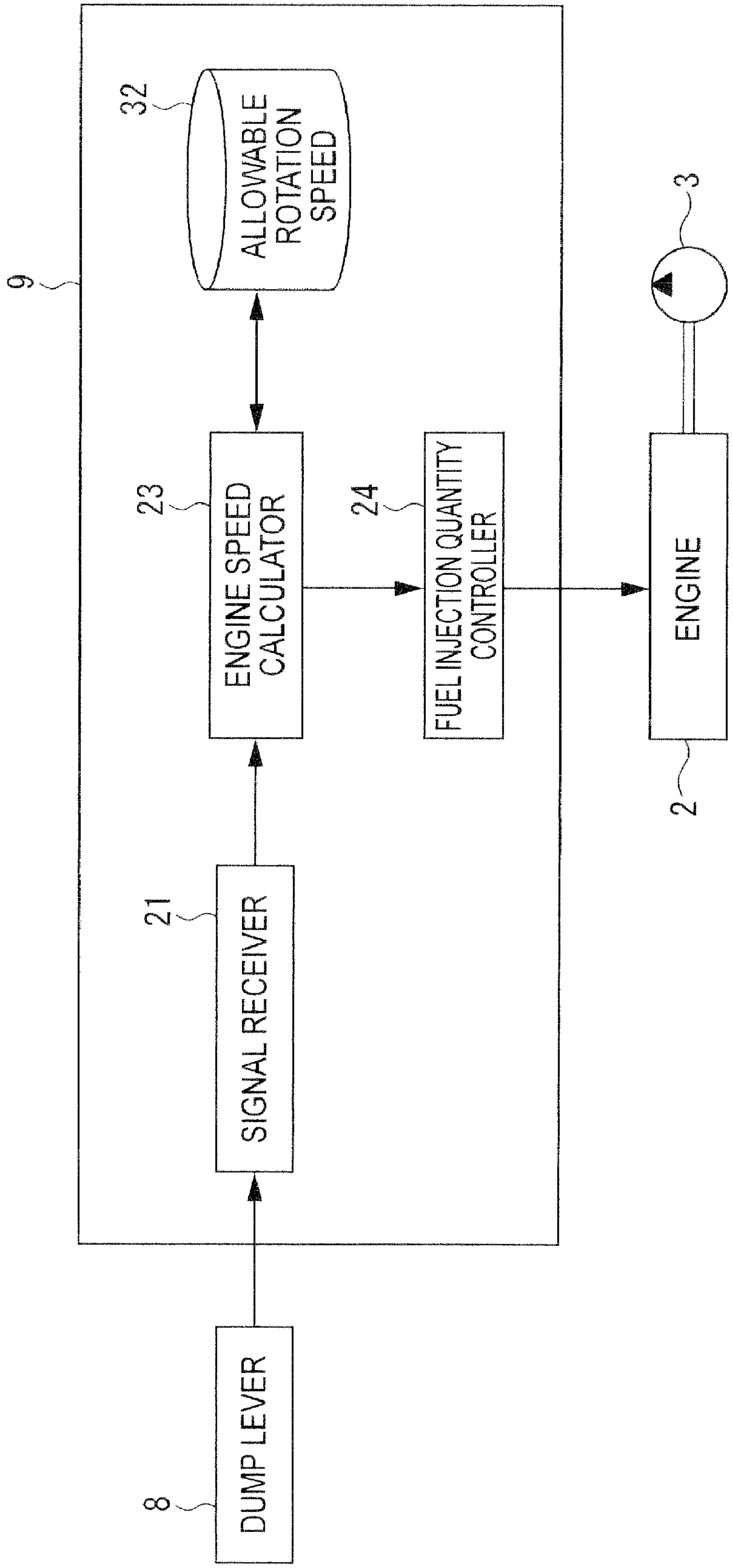
FIG. 2 is a block diagram according to the first exemplary embodiment.
Figure 3:
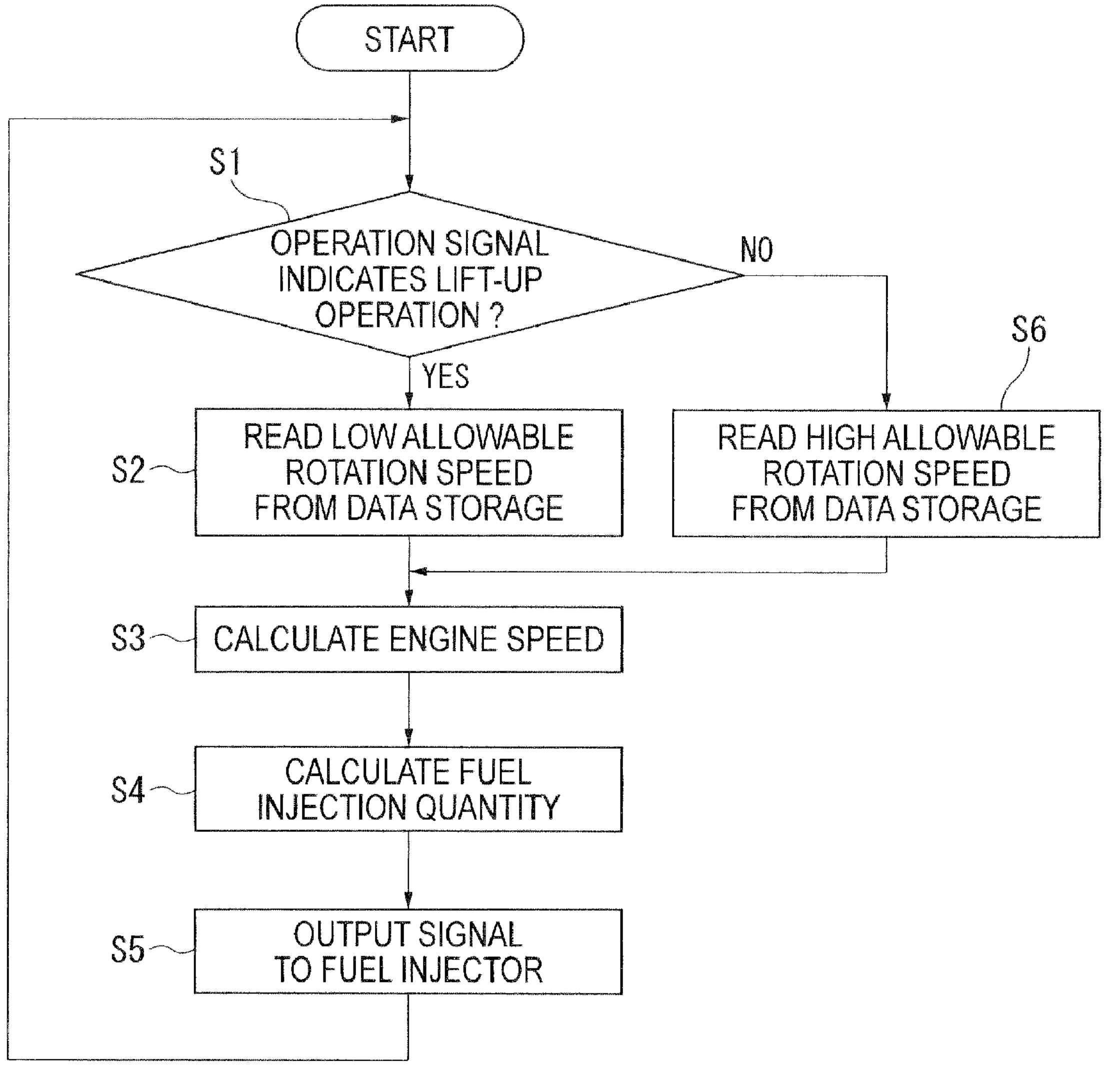
FIG. 3 is a flowchart according to the first exemplary embodiment.

FIGS. 1 to 3 show the first exemplary embodiment of a rotation control system of a hoist pump of the invention. FIG. 1 schematically shows a hydraulic circuit of the rotation control system of the hoist pump. The system controls a rotation speed of a hoist pump 3 when a body 5 provided on a dump truck is lifted up and down, thereby preventing cavitation within the hoist pump 3.

The hoist pump 3 has a constant capacity in the first exemplary embodiment, but may have a variable capacity.

As shown in FIG. 1, a vehicle body 1 of the dump truck includes: an engine 2; the hoist pump 3 driven by the engine 2; and a hydraulic oil tank 4 for storing hydraulic oil delivered through the hoist pump 3. The body 5 is rotatable so as to be vertically movable and is provided on a rear portion of the vehicle body 1. The body 5 and the vehicle body 1 are connected via a hoist cylinder 6 provided by a matched pair of hydraulic cylinders. A hoist valve 7 serving as a switching valve switches a flow of hydraulic oil in order to supply the hydraulic oil from the hoist pump 3 driven by the engine 2 to the hoist cylinder 6 or in order to return the hydraulic oil from the hoist cylinder 6 to the hydraulic oil tank 4. The vehicle body 1 is provided with a dump lever 8 serving as a working equipment lever for lifting the body 5 up and down. An operation signal in accordance with the lift-up operation or the lift-down operation is outputted from the dump lever 8 to a controller 9. Subsequently, a switching signal is outputted from the controller 9 to the hoist valve 7 based on the operation signal.

A working equipment according to an aspect of the invention includes the body 5 and the hoist cylinder 6.

FIG. 2 is a block diagram of the system, and FIG. 3 is a flowchart when the hoist pump is controllably rotated.

As shown in FIG. 2, the controller 9 includes: a signal receiver 21 for receiving the operation signal from the dump lever 8; a data storage 32 for storing data of allowable rotation speed of the hoist pump 3; an engine speed calculator 23 for calculating an engine speed of the engine 2 in accordance with the allowable rotation speed of the hoist pump 3; a fuel injection quantity controller 24 for controlling fuel injection quantity based on the engine speed calculated by the engine speed calculator 23.

The signal receiver 21 outputs a signal to the engine speed calculator 23 only when receiving the operation signal indicating that the dump lever 8 is lifted up by an operator. When the dump lever 8 is lifted down, the hoist cylinder 6 is retracted and therefore a large amount of hydraulic oil is returned to the hydraulic oil tank 4 from the bottom of the hoist cylinder 6. Accordingly, an oil level in the hydraulic oil tank 4 is not lowered and inner pressure thereof is also not lowered. Thus, it is not necessary to control the rotation speed of the hoist pump 3 to be slow in order to prevent cavitation.

The data of the allowable rotation speed of the hoist pump 3 preliminarily stored in the data storage 32 includes: data of low rotation speed at which cavitation does not occur in the hoist pump 3 even when the oil level within the hydraulic oil tank 4 is lowered and the inner pressure thereof is lowered to the minimum; and data of high rotation speed when the oil level within the hydraulic oil tank 4 is sufficiently high and the inner pressure thereof is sufficiently high. The data is decided substantially unambiguously in accordance with a capacity or the like of the hoist pump 3. Also, at high altitude, the allowable rotation speed is set to be slower since atmospheric pressure may be lowered. Further, a plurality of allowable rotation speeds in accordance with the atmospheric pressure and a plurality of allowable rotation speeds in accordance with the temperature of hydraulic oil may be stored in order to decide a proper allowable rotation speed depending on an actual condition.

A flow of the controller 9 when the above-described system is utilized will be described below with reference to FIG. 3.

When an operator manipulates the dump lever 8 and then the operation signal in accordance with the lift-up operation or the lift-down operation is outputted to the signal receiver 21 of the controller 9, the signal receiver 21 determines whether the operation signal indicates the lift-up operation or the lift-down operation (S1). When the operation signal indicates the lift-up operation of the body 5, the engine speed calculator 23 reads the low allowable rotation speed preliminarily stored in the data storage 32 (S2). With reference to the allowable rotation speed read from the data storage 32, the engine speed calculator 23 calculates an engine speed to drive the hoist pump 3 at the allowable rotation speed (S3).

Subsequently, the fuel injection quantity controller 24 calculates fuel injection quantity in accordance with the calculated engine speed (S4), and then outputs a signal to a fuel injector (not shown) provided on the engine 2 (S5). In contrast, when the operation signal is changed to indicate the lift-down operation by the manipulation of the dump lever 8 or when the operation signal is not outputted anymore because the dump lever 8 is manipulated to stop the body 5, it is not required that the engine 2 rotates at the low allowable rotation speed. Thus, the engine speed calculator 23 reads the high allowable rotation speed (S6). Then, the speed of the engine 2 is controlled based on S3 to S5.

As described above, since the hoist pump 3 is driven by the engine 2 always at the low allowable rotation speed while the body 5 is lifted up, cavitation can be prevented even when the suction pressure of the hydraulic oil in the hoist pump 3 is lowered and the pressure in the hydraulic oil tank 4 is remarkably lowered. At high altitude, it is only required to set the allowable rotation speed to be slower or to select a slower speed in accordance with the atmospheric pressure. Thus, cavitation can be also favorably prevented at high altitude.

SECOND EXEMPLARY EMBODIMENT

Figure 4:
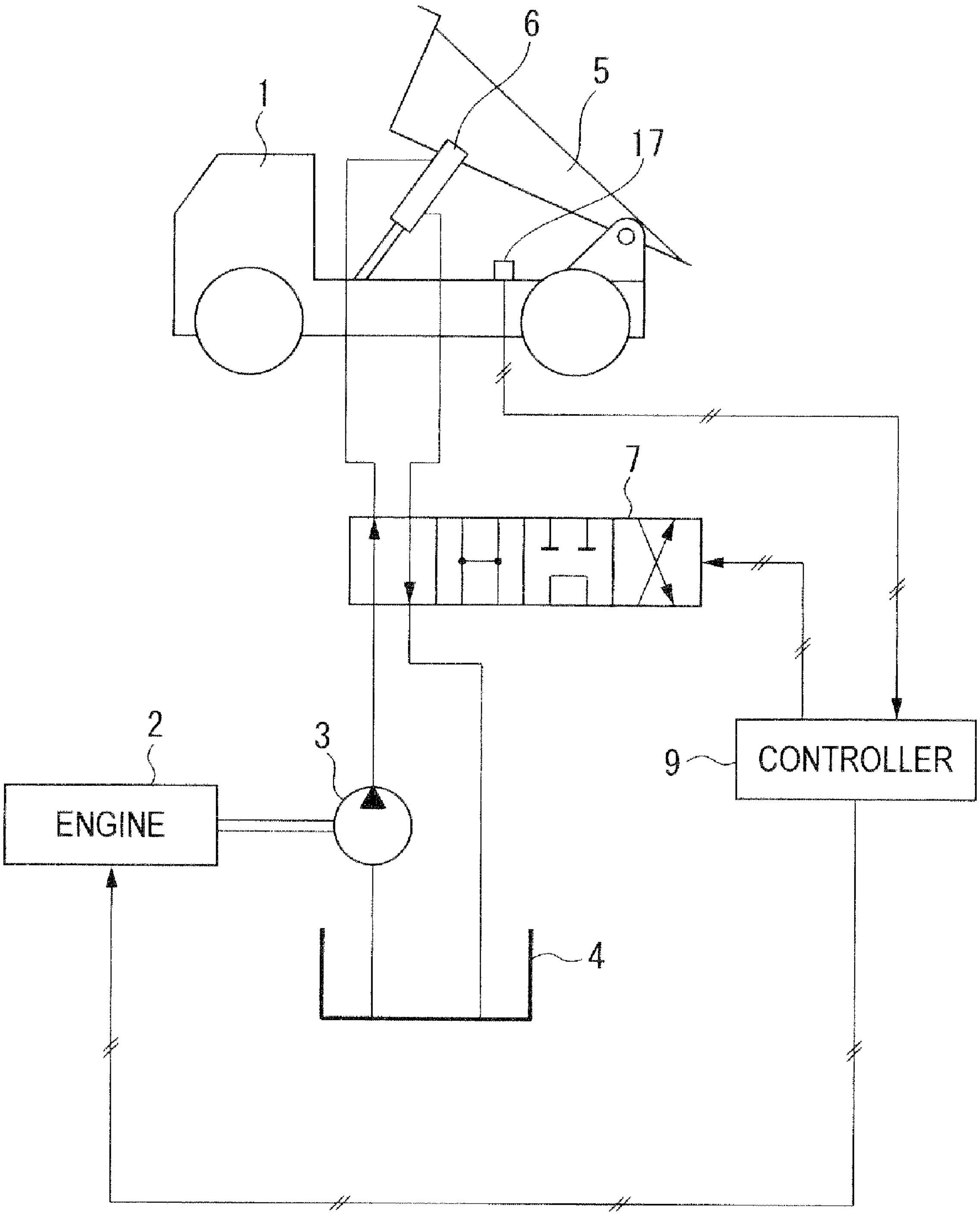
FIG. 4 schematically shows a hydraulic circuit of a rotation control system of a hoist pump according to a second exemplary embodiment of the invention.
Figure 5:
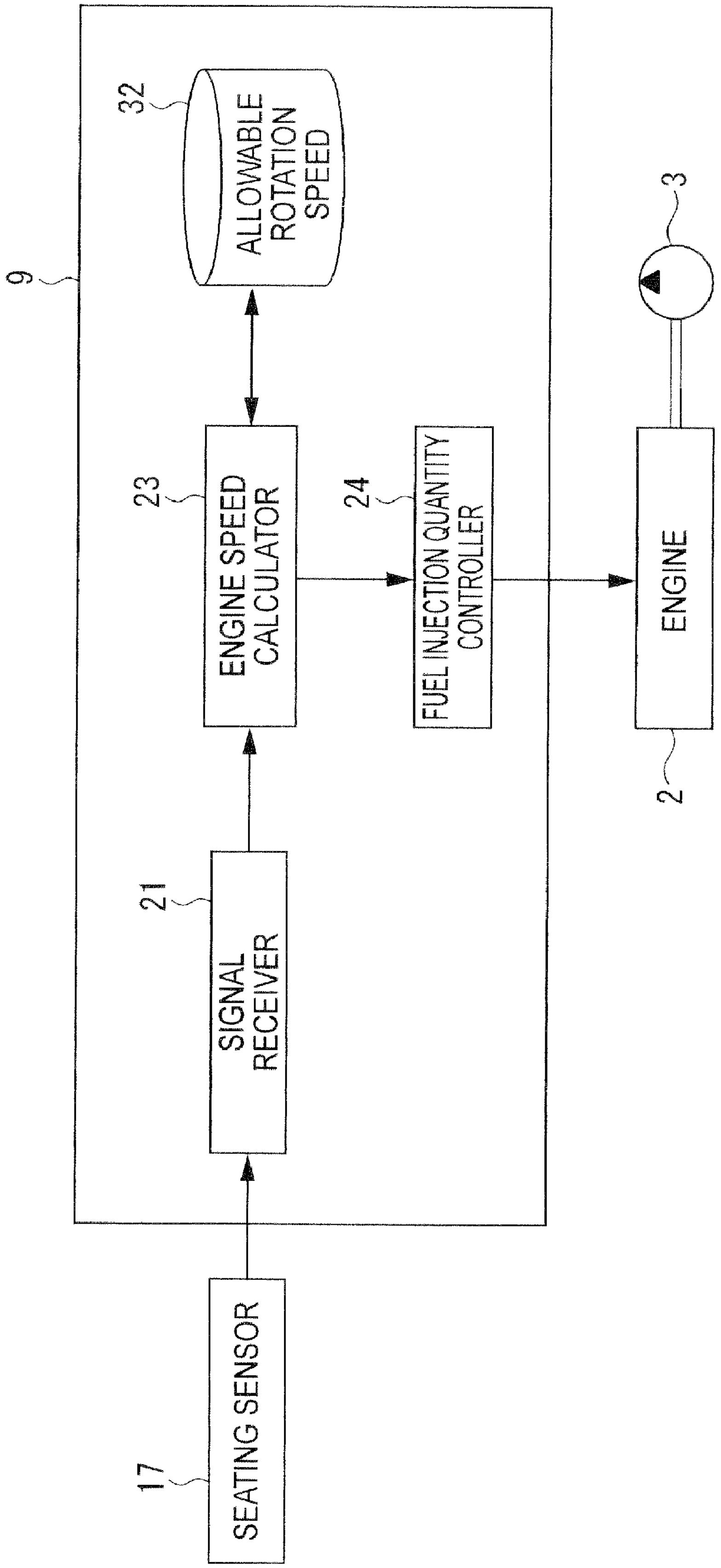
FIG. 5 is a block diagram according to the second exemplary embodiment.
Figure 6:
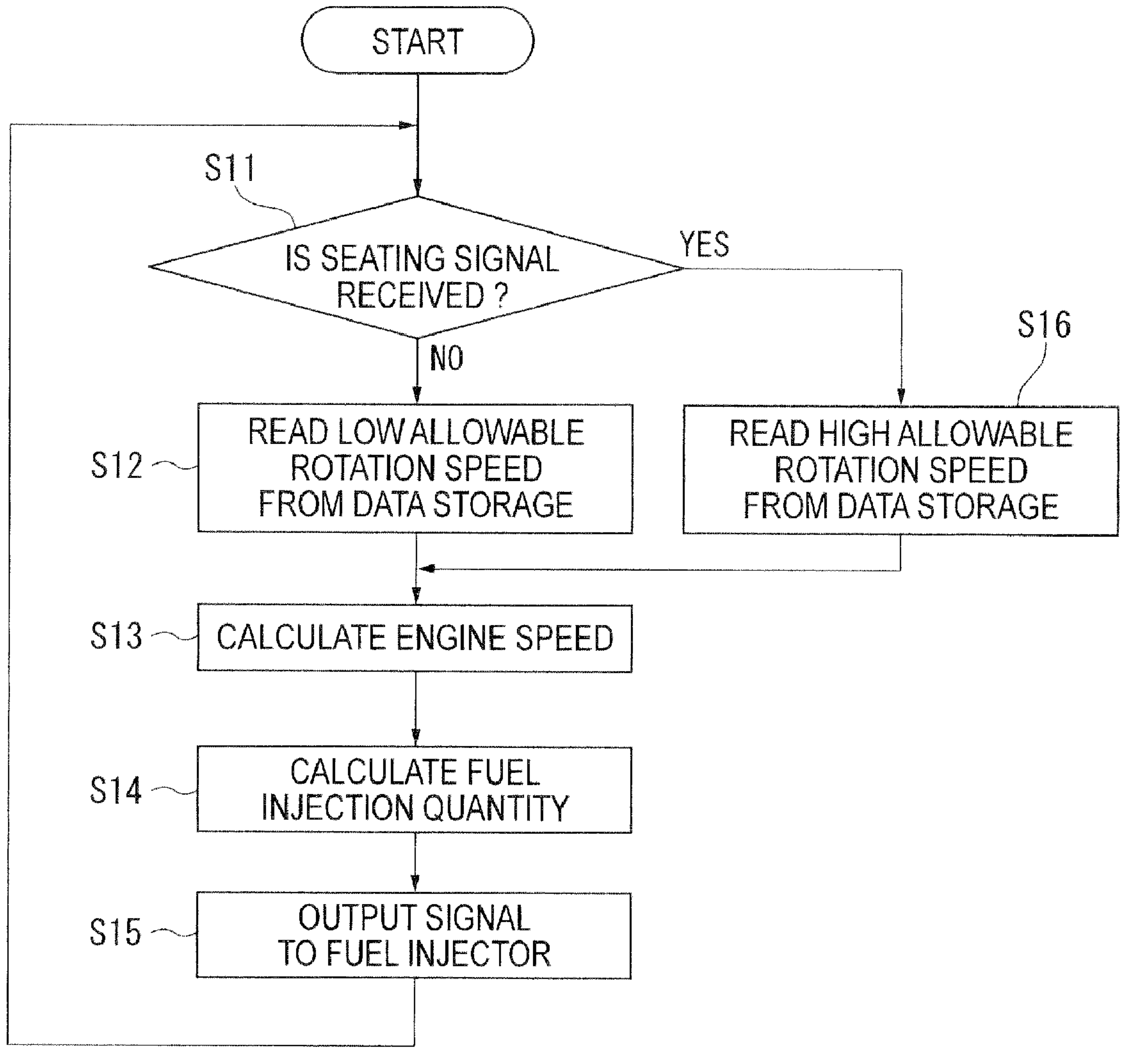
FIG. 6 is a flowchart according to the second exemplary embodiment.

FIGS. 4 to 6 show a second exemplary embodiment of the rotation control system of the hoist pump of the invention. FIG. 4 schematically shows a hydraulic circuit of the rotation control system of the hoist pump according to the second exemplary embodiment. In this exemplary embodiment, a seating sensor 17 serving as a position sensor detects the elevating operation of the body 5. The seating sensor 17 outputs a seating signal when the body 5 is seated and does not output the seating signal when the body 5 is lifted up.

As shown in FIG. 4, the vehicle body 1 of the dump truck includes the seating sensor 17 on a position where the body 5 is lifted down and seated. Thus, the seating signal is inputted to the signal receiver 21 of the controller 9 as shown in FIG. 5 when the body 5 is seated. Other arrangements are the same as those of the first exemplary embodiment.

Similarly to the first exemplary embodiment, data of the allowable rotation speed of the hoist pump 3 preliminarily stored in the data storage 32 includes: data of low allowable rotation speed at which cavitation does not occur in the hoist pump 3 even when the inner pressure in the hydraulic oil tank 4 is lowered to the minimum (when the body 5 is lifted up to the maximum); and data of high rotation speed at which cavitation does not occur in the hoist pump 3 when the inner pressure in the hydraulic oil tank 4 is sufficiently high (when the body 5 is seated).

A flow of the controller 9 when the above-described system is utilized will be described below with reference to FIG. 6.

The seating sensor 17 detects whether the body 5 is seated or not. The seating sensor 17 outputs a detection signal when the body 5 is seated, but does not output the detection signal when the body 5 is not seated. The signal receiver 21 determines whether the detection signal is received or not (S11). When the body 5 is lifted up (not seated), the detection signal is not received. Accordingly, the engine speed calculator 23 reads the low allowable rotation speed from the data storage 32 (S12). The engine speed calculator 23 calculates an engine speed to drive the hoist pump 3 at the allowable rotation speed (S13). Subsequently, the fuel injection quantity controller 24 calculates fuel injection quantity (S14), and outputs a signal to the fuel injector (not shown) (S15). Conversely, when the signal receiver 21 receives the detection signal, the engine speed calculator 23 reads the high allowable speed from the data storage 32 (S16). Then, the speed of the engine 2 is controlled based on S13 to S15.

In the second exemplary embodiment, the rotation speed of the hoist pump 3 can be also favorably controlled so that the same advantages as those of the first exemplary embodiment can be attained. Incidentally, in the second exemplary embodiment, since the oil level within the hydraulic oil tank 4 is low even when the body 5 is stopped before being completely lifted up, the rotation speed of the hoist pump 3 is maintained to be the low allowable rotation speed so as to prevent cavitation.

THIRD EXEMPLARY EMBODIMENT

Figure 7:
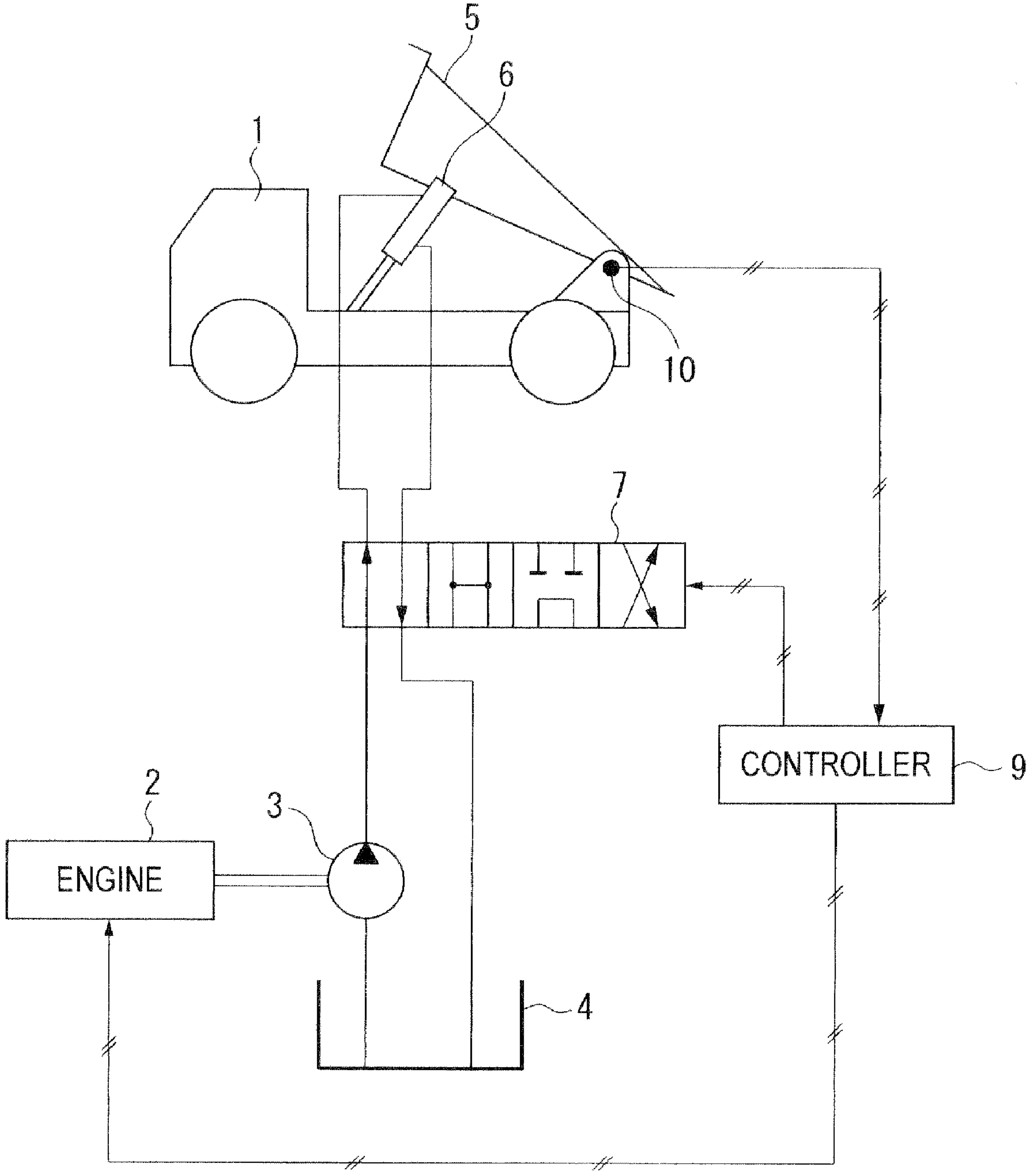
FIG. 7 schematically shows a hydraulic circuit of a rotation control system of a hoist pump according to a third exemplary embodiment of the invention.
Figure 8:
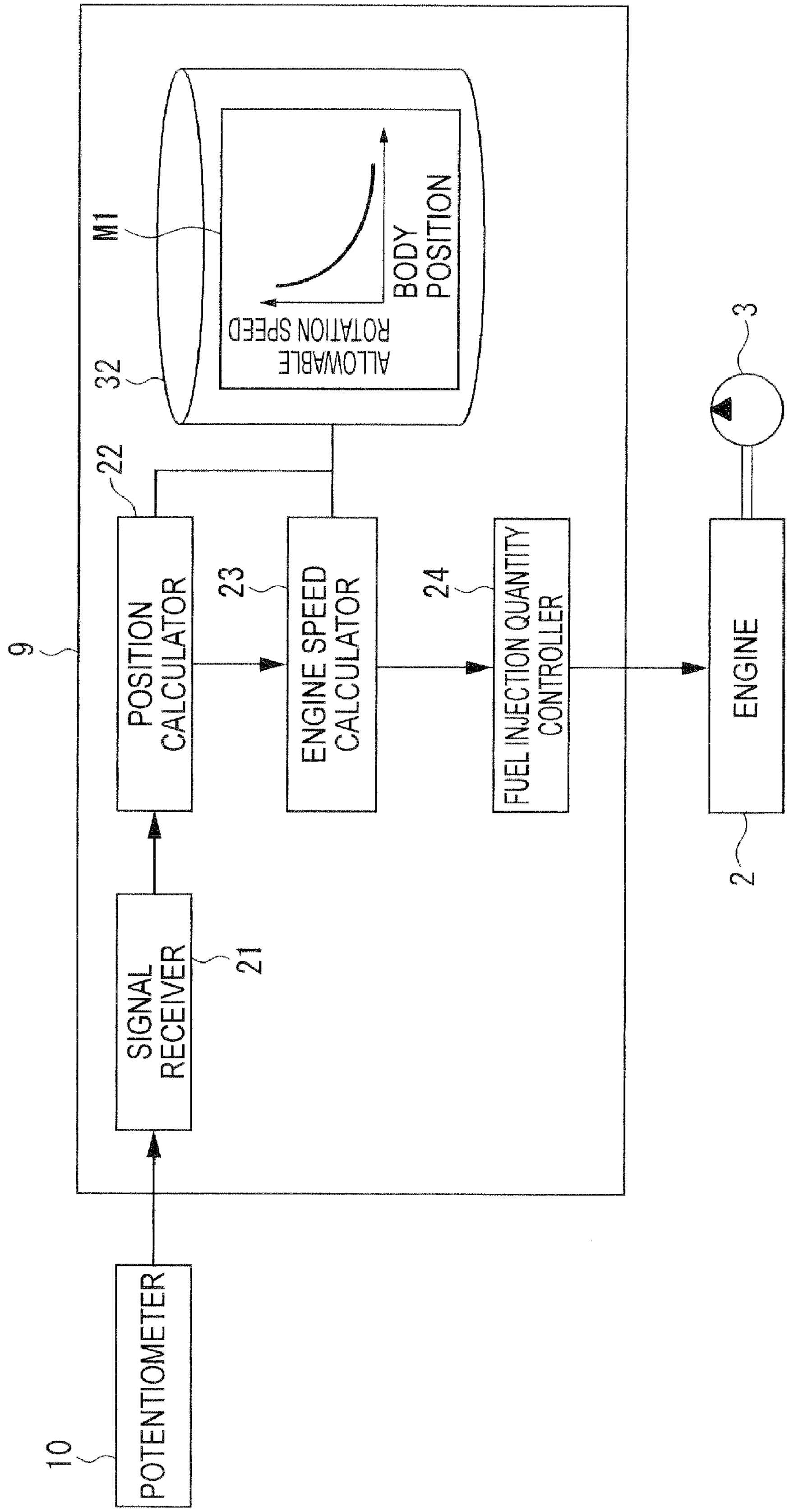
FIG. 8 is a block diagram according to the third exemplary embodiment.
Figure 9:
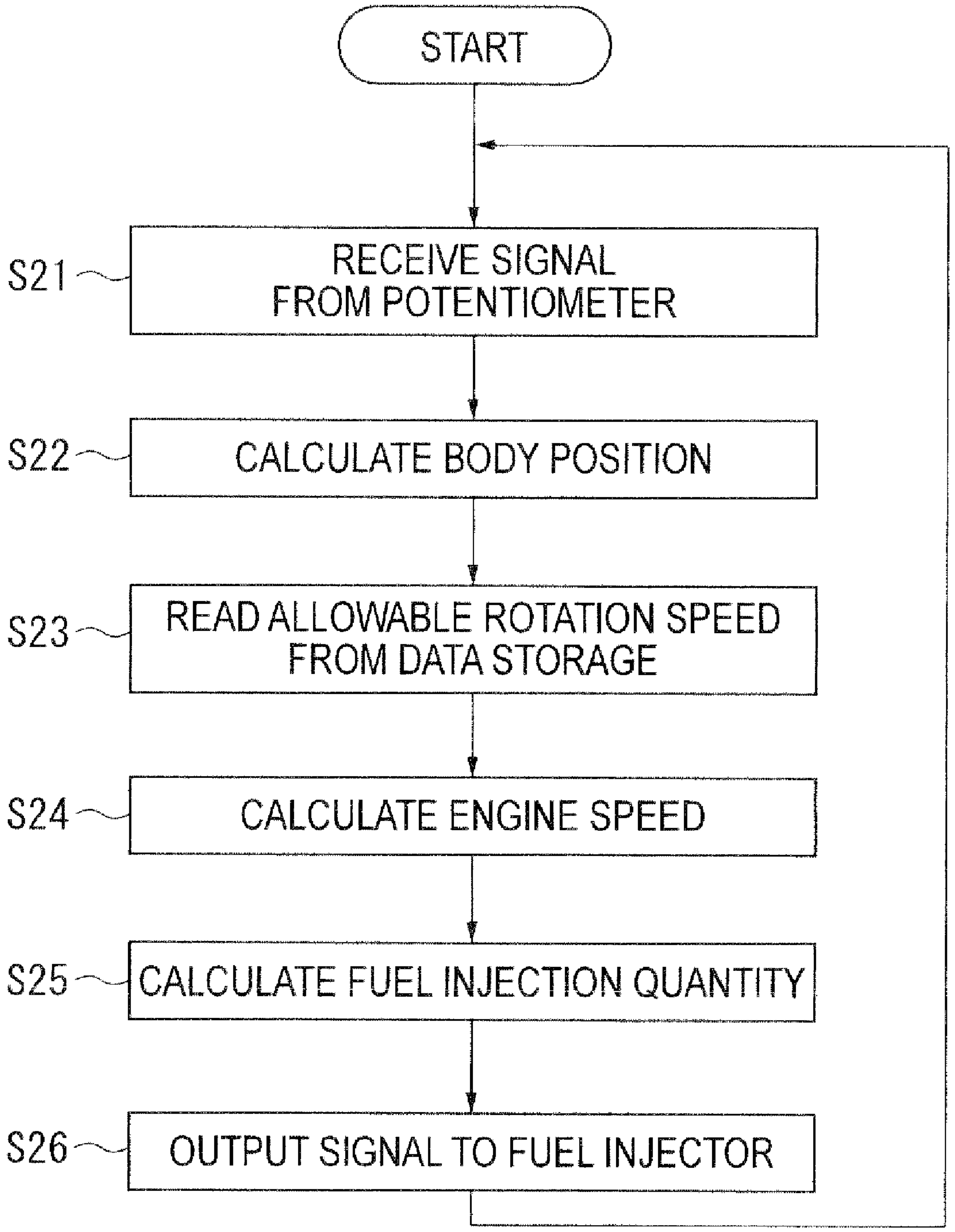
FIG. 9 is a flowchart according to the third exemplary embodiment.

FIGS. 7 to 9 show a third exemplary embodiment of the rotation control system of the hoist pump of the invention. FIG. 7 schematically shows a hydraulic circuit of the rotation control system of the hoist pump according to the third exemplary embodiment. In this exemplary embodiment, an inclination position of the body 5 is consecutively measured by a potentiometer 10. When the potentiometer 10 determines that the body 5 is lifted up, the rotation speed of the hoist pump 3 is controlled by the controller 9.

As shown in FIG. 7, the vehicle body 1 of the dump truck includes the potentiometer 10 for measuring the inclination position of the body 5 on a position where the body 5 and the vehicle body 1 are connected to each other. Thus, a position measurement signal is consecutively inputted from the potentiometer 10 to the signal receiver 21 of the controller 9 as shown in FIG. 8. Other arrangements are the same of those of the first exemplary embodiment.

In particular, when the signal receiver 21 receives the position measurement signal from the potentiometer 10, the signal receiver 21 outputs the signal to a position calculator 22 to calculate a position of the body 5.

The data storage 32 preliminarily stores a map M1 of the allowable rotation speed of the hoist pump 3 determined in accordance with the position of the body 5. In other words, by calculating the allowable rotation speed from the position of the body 5 calculated by the position calculator 22, the rotation speed can be easily controlled in accordance with the position of the body 5.

A flow of the controller 9 when the above-described system is utilized will be described below with reference to FIG. 9.

The potentiometer 10 measures an inclination angle of the body 5, and outputs the measured position measurement signal to the signal receiver 21 of the controller 9. When the signal receiver 21 receives the signal (S21), the position calculator 22 calculates a position of the body 5 (S22). With reference to the map M1 of the allowable rotation speed determined in accordance with the position of the body 5, the engine speed calculator 23 reads an allowable rotation speed in accordance with the body position from the data storage 32 (S23). The engine speed calculator 23 calculates an engine speed in accordance with the read allowable rotation speed (S24). Subsequently, the fuel injection quantity controller 24 calculates fuel injection quantity in accordance with the calculated engine speed (S25), and outputs a signal to the fuel injector (not shown) (S26). Thus, the engine 2 drives the hoist pump 3 always at the allowable rotation speed determined in accordance with the position of the body 5.

In the third exemplary embodiment, the rotation speed of the hoist pump 3 can be also favorably controlled so that the same advantages as those of the first exemplary embodiment can be attained. Additionally, since the rotation speed is controlled in accordance with the suction pressure varied depending on the position of the body 5 in the third exemplary embodiment, the rotation speed can be controlled more precisely as compared to the first and second exemplary embodiments. Also, while the position of the body 5 is low, it is not required that the rotation speed of the hoist pump 3 is remarkably lowered. Thus, the body 5 can be quickly lifted up, so that work efficiency can be enhanced.

FOURTH EXEMPLARY EMBODIMENT

Figure 10:
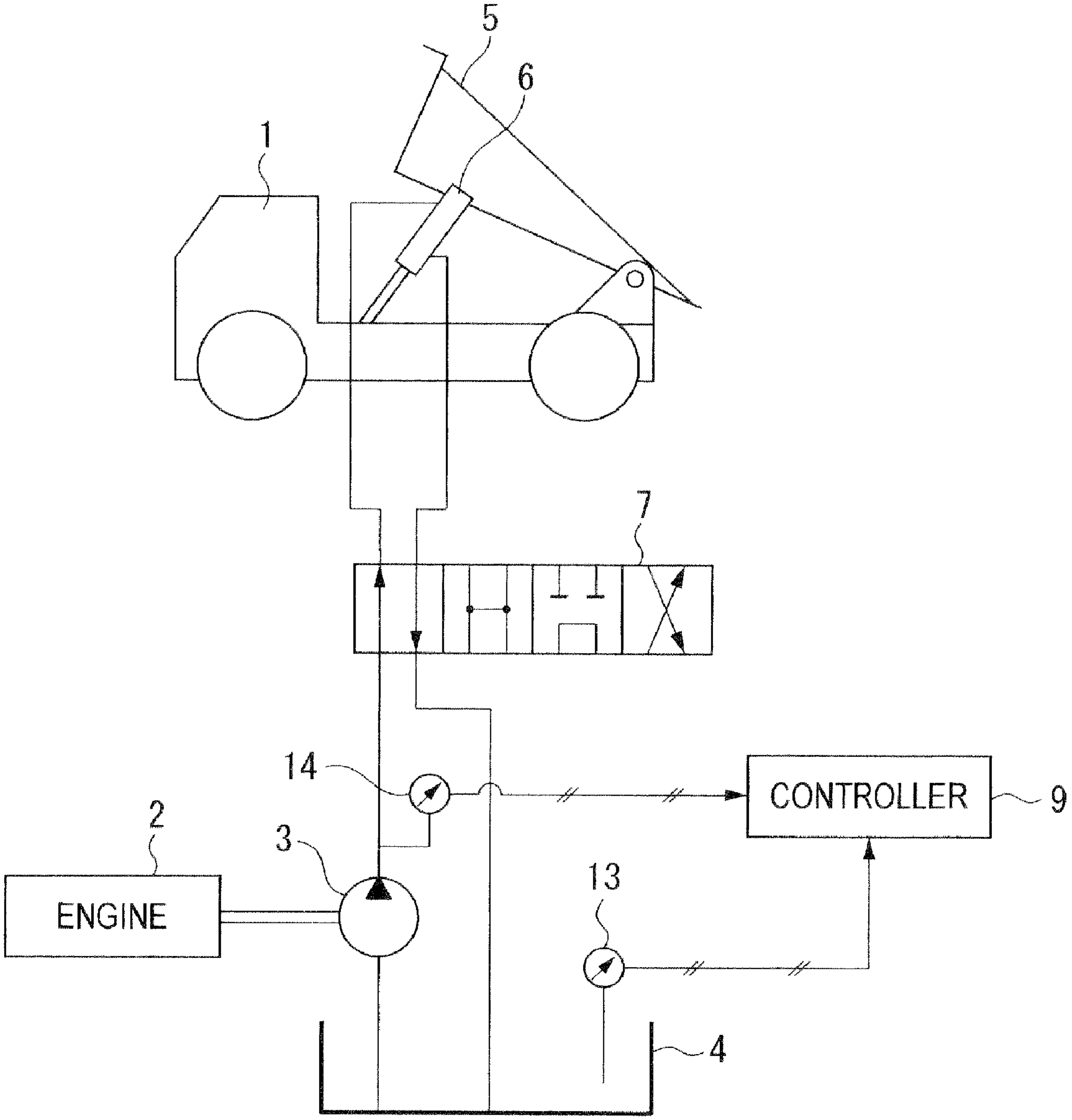
FIG. 10 schematically shows a hydraulic circuit of a rotation control system of a hoist pump according to a fourth exemplary embodiment of the invention.
Figure 11:
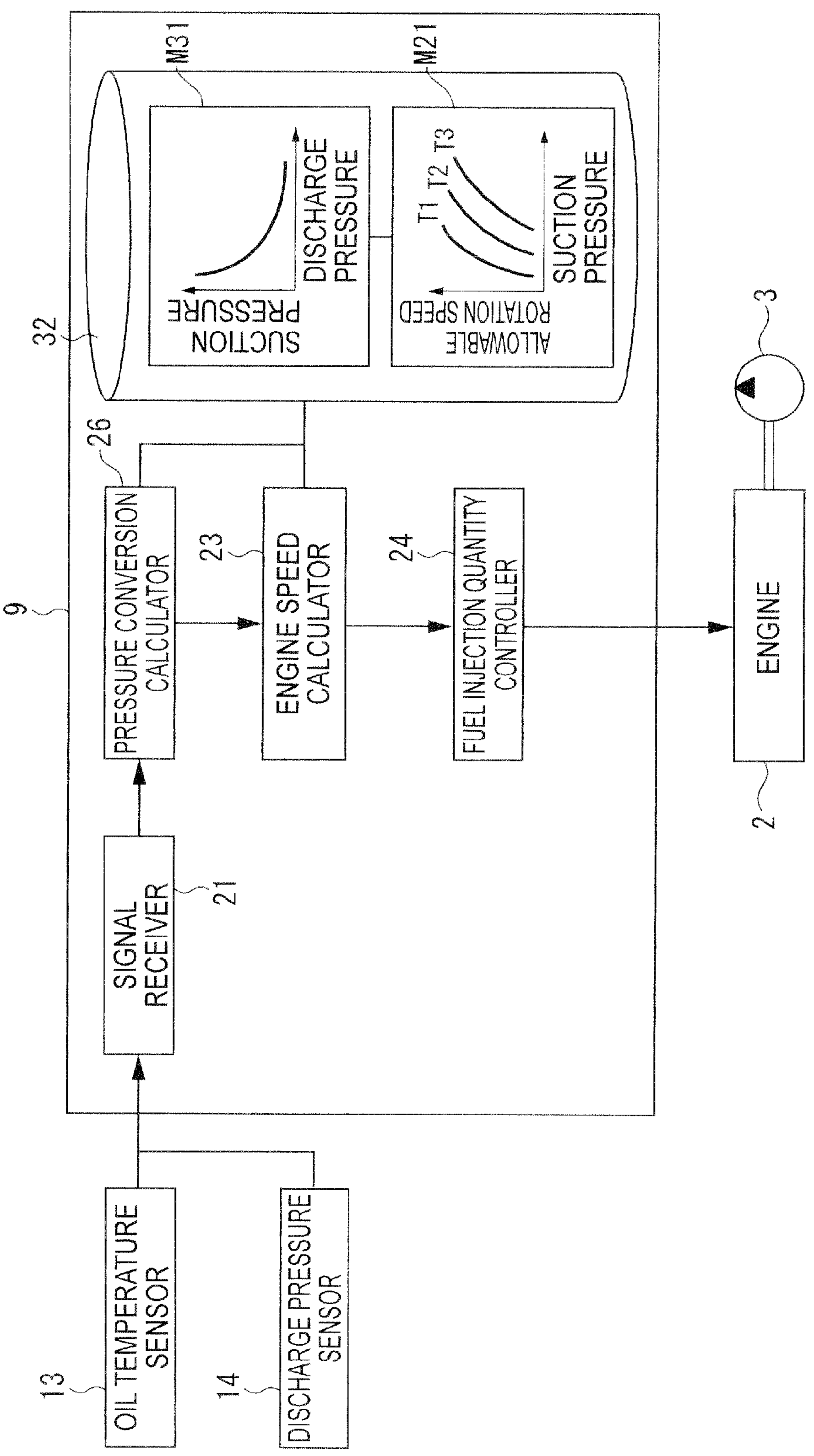
FIG. 11 is a block diagram according to the fourth exemplary embodiment.
Figure 12:
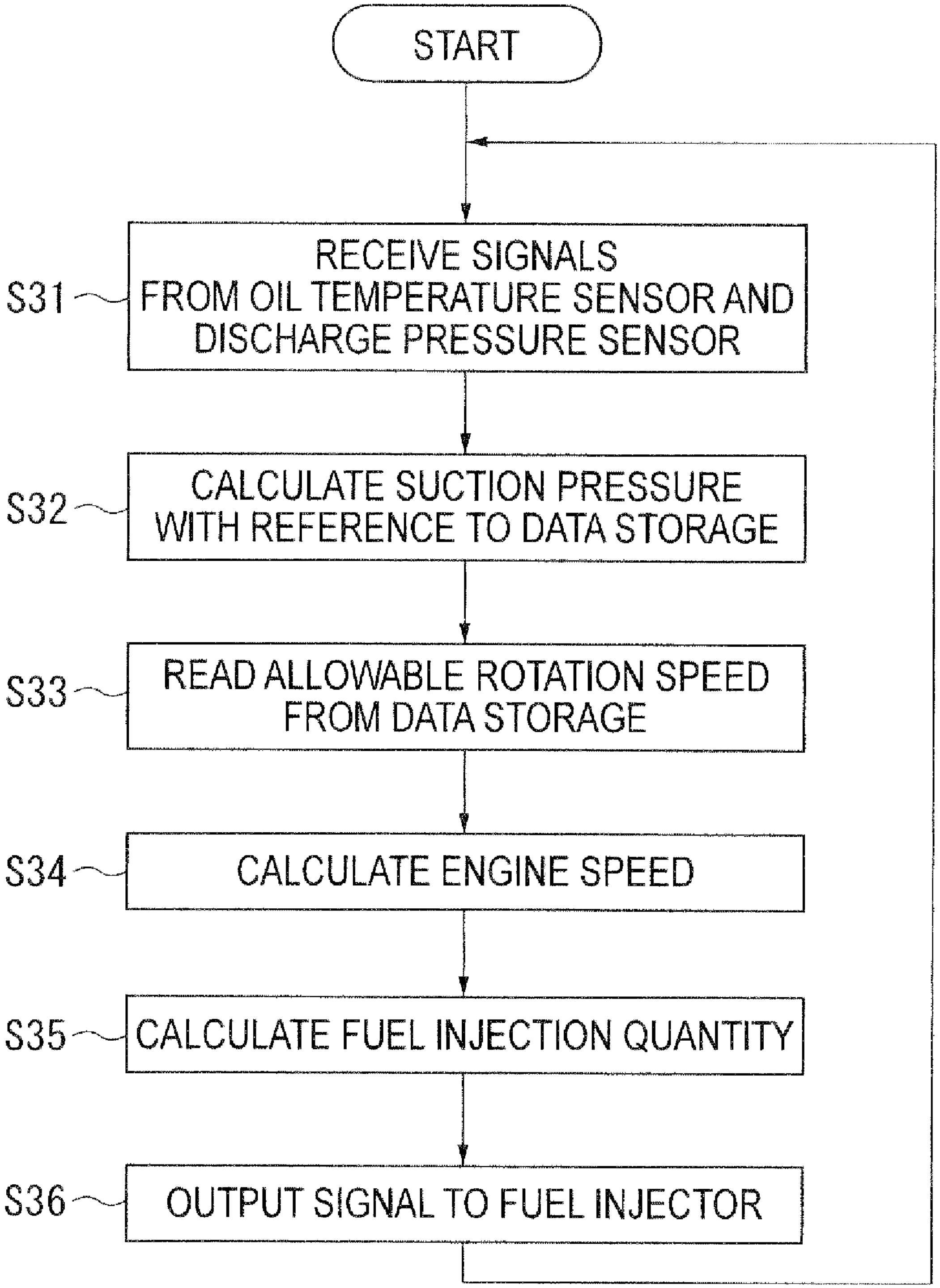
FIG. 12 is a flowchart according to the fourth exemplary embodiment.

In the fourth exemplary embodiment of the invention as shown in FIGS. 10 to 12, the rotation speed of the hoist pump 3 is controlled in accordance with the change of the discharge pressure and temperature of hydraulic oil.

As shown in FIG. 10, the vehicle body 1 of the dump truck includes: an oil temperature sensor 13 for measuring the temperature of hydraulic oil in the hydraulic oil tank 4; and a discharge pressure sensor 14 provided on a discharging pipe of the hoist pump 3 for measuring the discharge pressure.

In the block diagram shown in FIG. 11, the signal receiver 21 of this exemplary embodiment receives an oil temperature measurement signal outputted from the oil temperature sensor 13 and a discharge pressure measurement signal outputted from the discharge pressure sensor 14. Upon receiving the signals from the oil temperature sensor 13 and the discharge pressure sensor 14, the signal receiver 21 outputs the signals to a pressure conversion calculator 26.

The pressure conversion calculator 26 receives the discharge pressure measurement signal from the signal receiver 21 to calculate the discharge pressure in accordance with the signal.

The data storage 32 preliminarily stores a map M31 for converting the discharge pressure to the suction pressure. The data storage 32 also stores a map M21 of the allowable rotation speed of the hoist pump 3 determined by the suction pressure and the oil temperatures T1, T2, T3, . . . . In other words, in this exemplary embodiment, the rotation speed can be more precisely calculated in accordance with the discharge pressure so as to securely prevent cavitation.

A flow of the above-described system will be described below with reference to FIG. 12.

When the oil temperature sensor 13 measures the oil temperature in the hydraulic oil tank 4 and the discharge pressure sensor 14 measures the pressure in a suction part of the hoist pump 3, the oil temperature measurement signal and the discharge pressure measurement signal are outputted to the controller 9, so that the signal receiver 21 receives the signals (S31). Upon receiving the discharge pressure measurement signal from the signal receiver 21, the pressure conversion calculator 26 reads the map M31 for converting discharge pressure to suction pressure to calculate suction pressure (S32). With reference to the map M21 of the allowable rotation speed determined by the calculated suction pressure and the oil temperatures T1, T2, T3, . . . , the engine speed calculator 23 reads an allowable rotation speed of the hoist pump 3 (S33) and calculates an engine speed (S34). Subsequently, the fuel injection quantity controller 24 calculates fuel injection quantity in accordance with the calculated engine speed (S35). Then, the fuel injection quantity controller 24 outputs a signal to the fuel injector (not shown) provided on the engine 2 (S36). Thus, the engine 2 drives the hoist pump 3 at the allowable rotation speed.

In the fourth exemplary embodiment, the rotation speed of the hoist pump 3 can be controlled so that the same advantages as those of the first exemplary embodiment can be attained. Also, in the dump truck, the discharge pressure is temporarily increased when the hoist cylinder 6 is started to be extended or when the body 5 is completely lifted up. However, since the allowable rotation speed is determined in accordance with the discharge pressure of the hoist pump 3 in this exemplary embodiment, the allowable rotation speed can be controlled to be slower in accordance with the discharge pressure even when the discharge pressure is suddenly varied. Thus, cavitation can be more reliably prevented.

FIFTH EXEMPLARY EMBODIMENT

Figure 13:
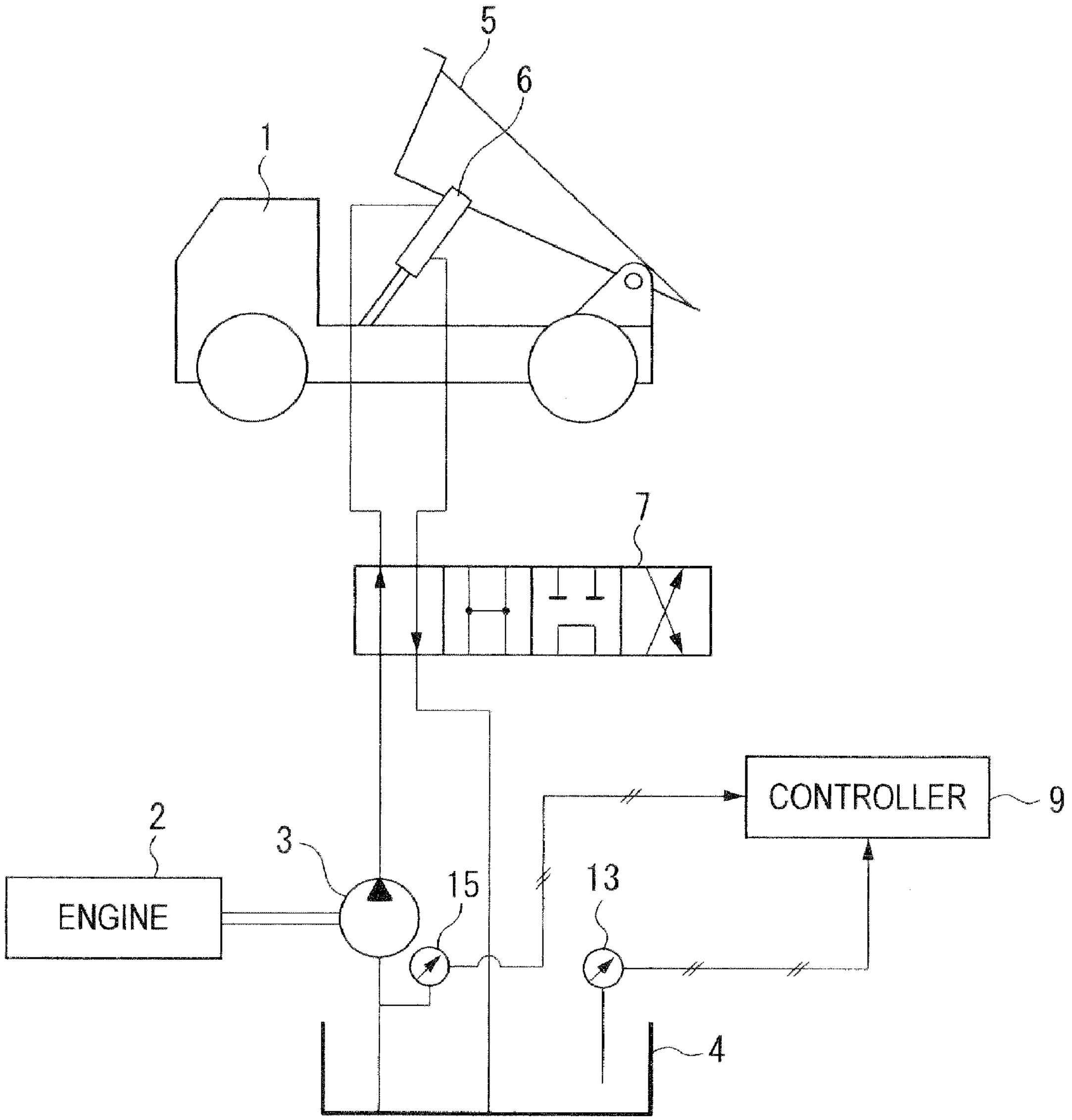
FIG. 13 schematically shows a hydraulic circuit of a rotation control system of a hoist pump according to a fifth exemplary embodiment of the invention.
Figure 14:
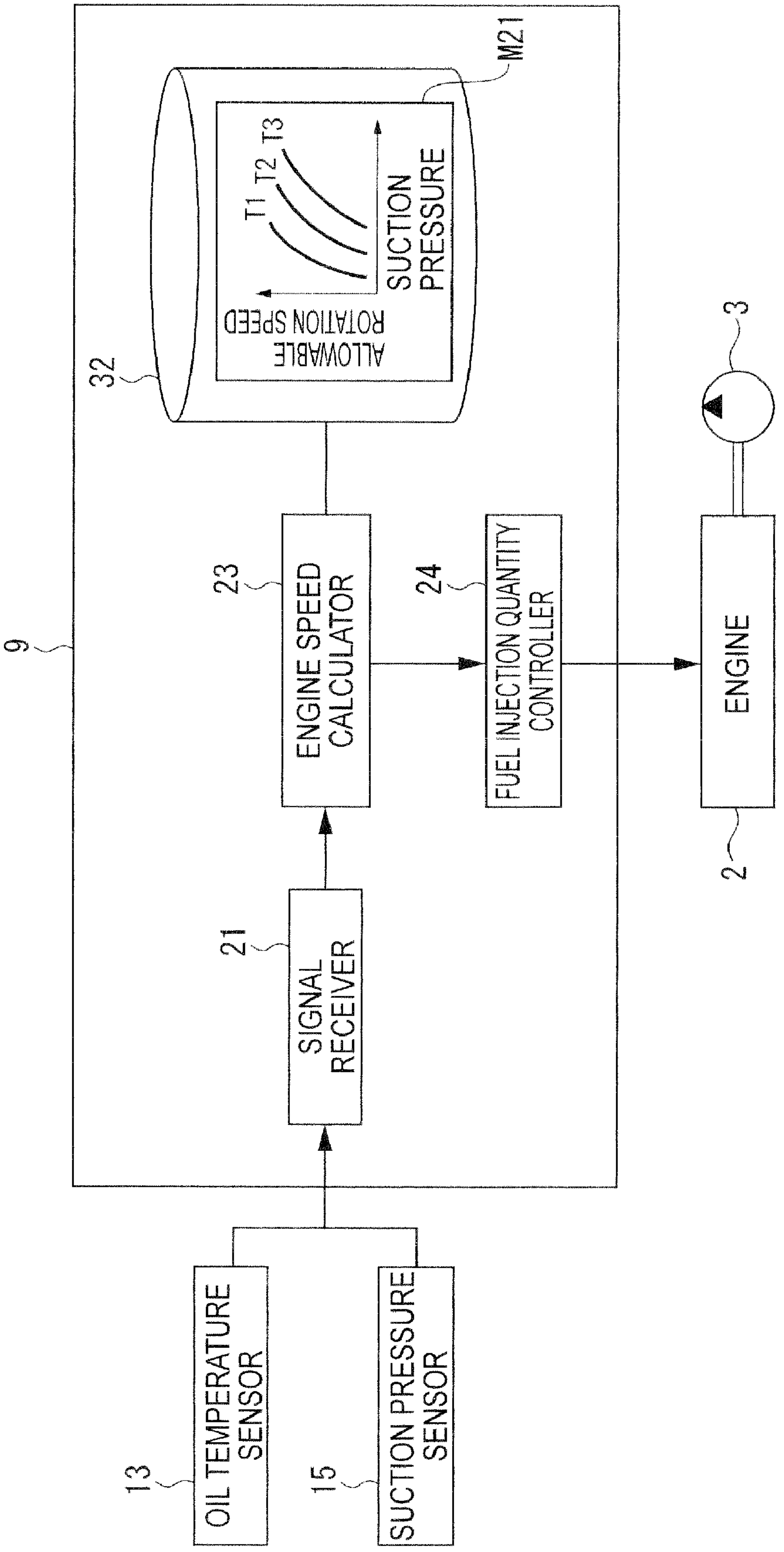
FIG. 14 is a block diagram according to the fifth exemplary embodiment.
Figure 15:
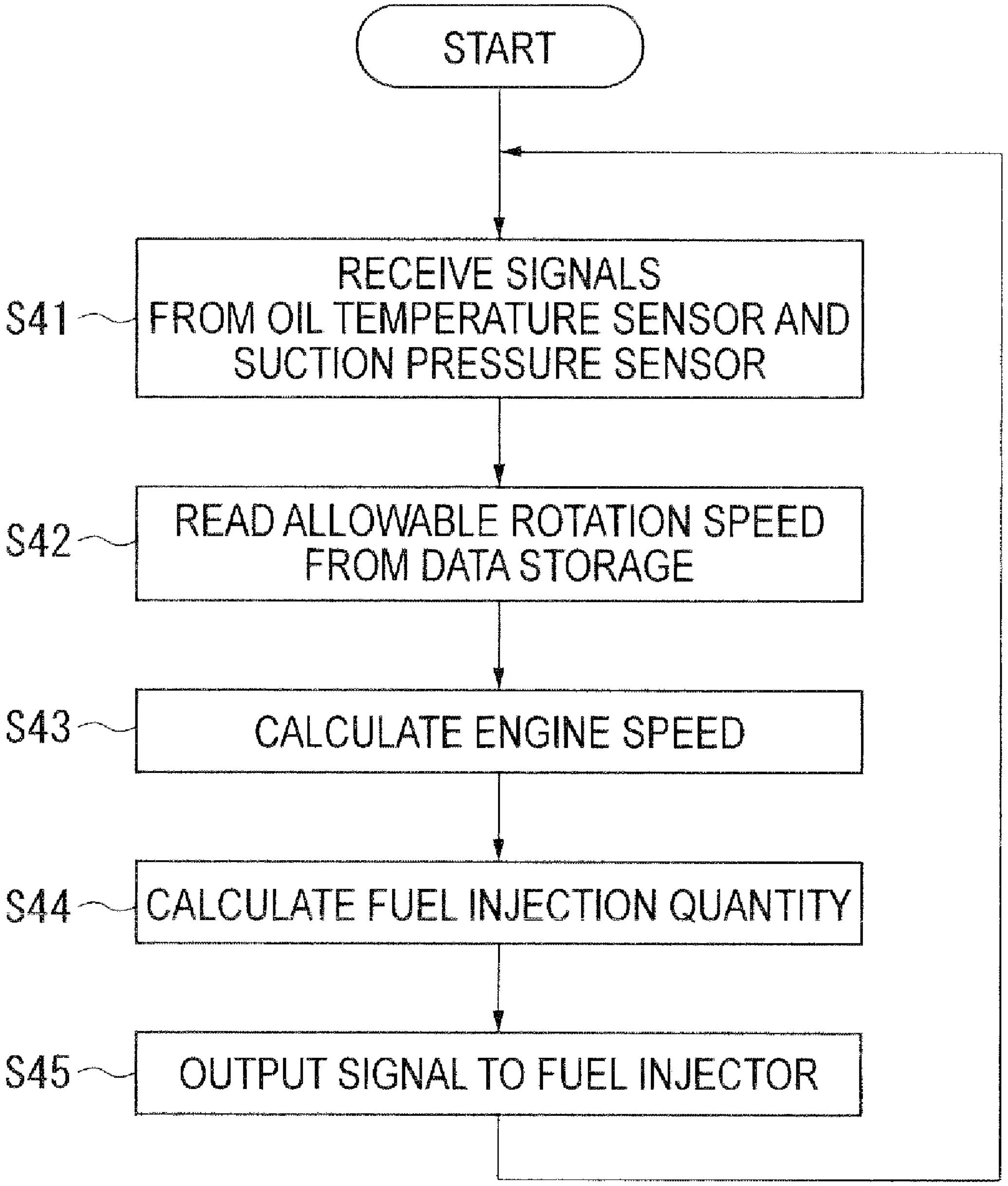
FIG. 15 is a flowchart according to the fifth exemplary embodiment.

In the fifth exemplary embodiment of the invention as shown in FIGS. 13 to 15, the rotation speed is not controlled by measuring the discharge pressure of the hoist pump 3. Instead, the rotation speed of the hoist pump 3 is controlled by measuring the suction pressure of the hoist pump 3.

As shown in FIG. 13, the vehicle body 1 of the dump truck includes: the oil temperature sensor 13 for measuring temperature of hydraulic oil in the hydraulic oil tank 4; and a suction pressure sensor 15 provided on a suction pipe of the hoist pump 3 for measuring suction pressure.

In the block diagram shown in FIG. 14, the signal receiver 21 of the fifth exemplary embodiment receives an oil temperature measurement signal of the hydraulic oil in the tank outputted from the oil temperature sensor 13 and a suction pressure measurement signal of the hoist pump 3 outputted from the suction pressure sensor 15. In the fifth exemplary embodiment, the pressure conversion calculator 26 is not required as in the fourth exemplary embodiment since the suction pressure of the hoist pump 3 can be measured. Thus, the structure of the controller 9 can be simplified.

In particular, the signal receiver 21 receives the signals from the oil temperature sensor 13 and the suction pressure sensor 15.

The data storage 32 stores the map M21 of the allowable rotation speed of the hoist pump 3 determined by the suction pressure and the oil temperatures T1, T2, T3, . . . . In other words, in this exemplary embodiment, the rotation speed can be directly calculated in accordance with the suction pressure so as to reliably prevent cavitation.

A flow of the above-described system will be described below with reference to FIG. 15.

When the oil temperature sensor 13 measures the oil temperature and the suction pressure sensor 15 measures the pressure of the suction part of the hoist pump 3, the oil temperature measurement signal and the suction pressure measurement signal are outputted to the controller 9, so that the signal receiver 21 receives the signals (S41). With reference to the map M21 of the allowable rotation speed determined by the calculated suction pressure and the oil temperatures T1, T2, T3, . . . , the engine speed calculator 23 reads an allowable rotation speed of the hoist pump 3 (S42) and calculates an engine speed (S43). Subsequently, the fuel injection quantity controller 24 calculates fuel injection quantity in accordance with the calculated engine speed (S44). Then, the fuel injection quantity controller 24 outputs a signal to the fuel injector (not shown) provided on the engine 2 (S45). Thus, the engine 2 drives the hoist pump 3 at the allowable rotation speed.

In the fifth exemplary embodiment, the rotation speed of the hoist pump 3 can be controlled so that the same advantages as those of the first and fourth exemplary embodiments can be attained.

SIXTH EXEMPLARY EMBODIMENT

Figure 16:
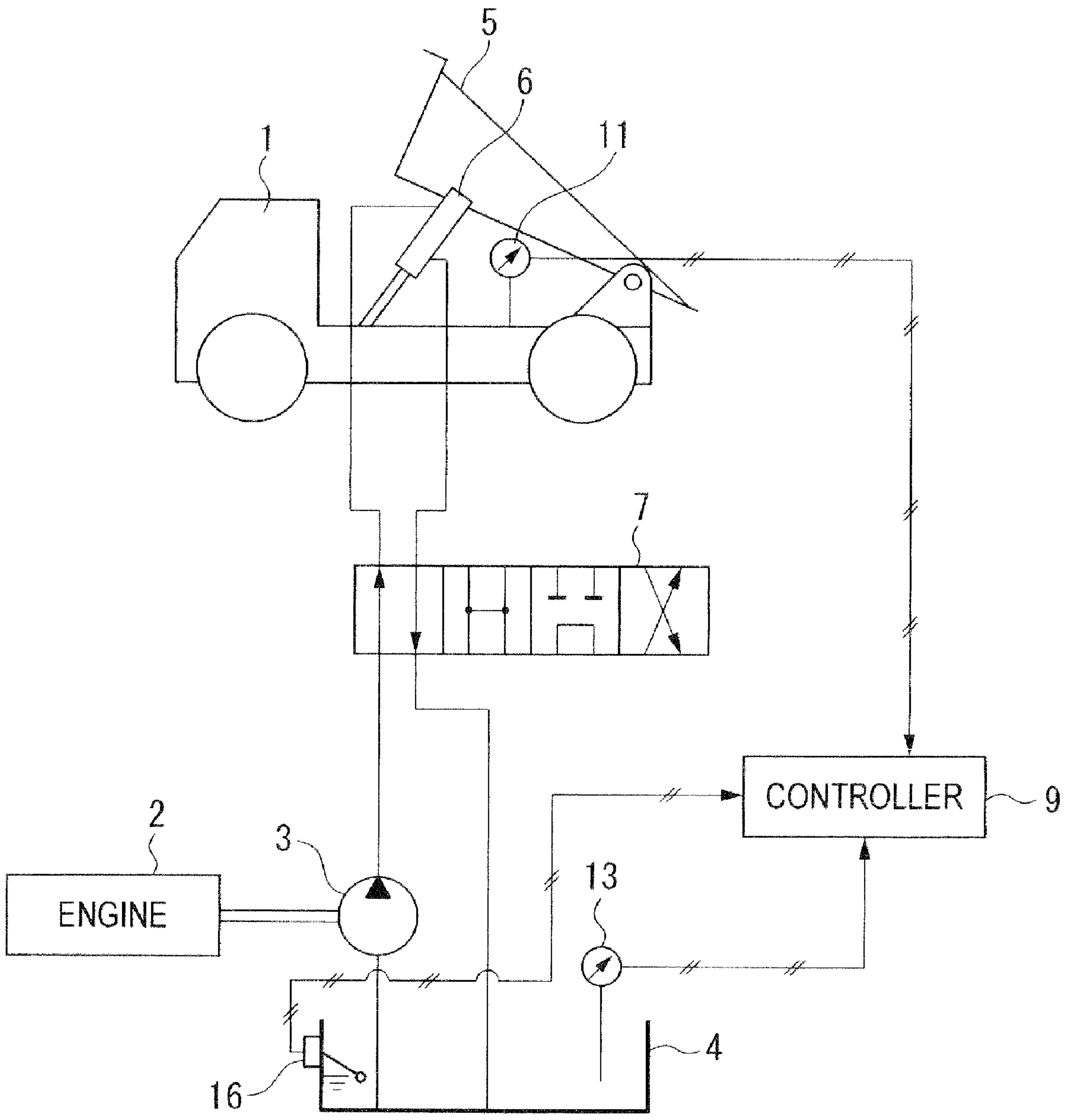
FIG. 16 schematically shows a hydraulic circuit of a rotation control system of a hoist pump according to a sixth exemplary embodiment of the invention.
Figure 17:
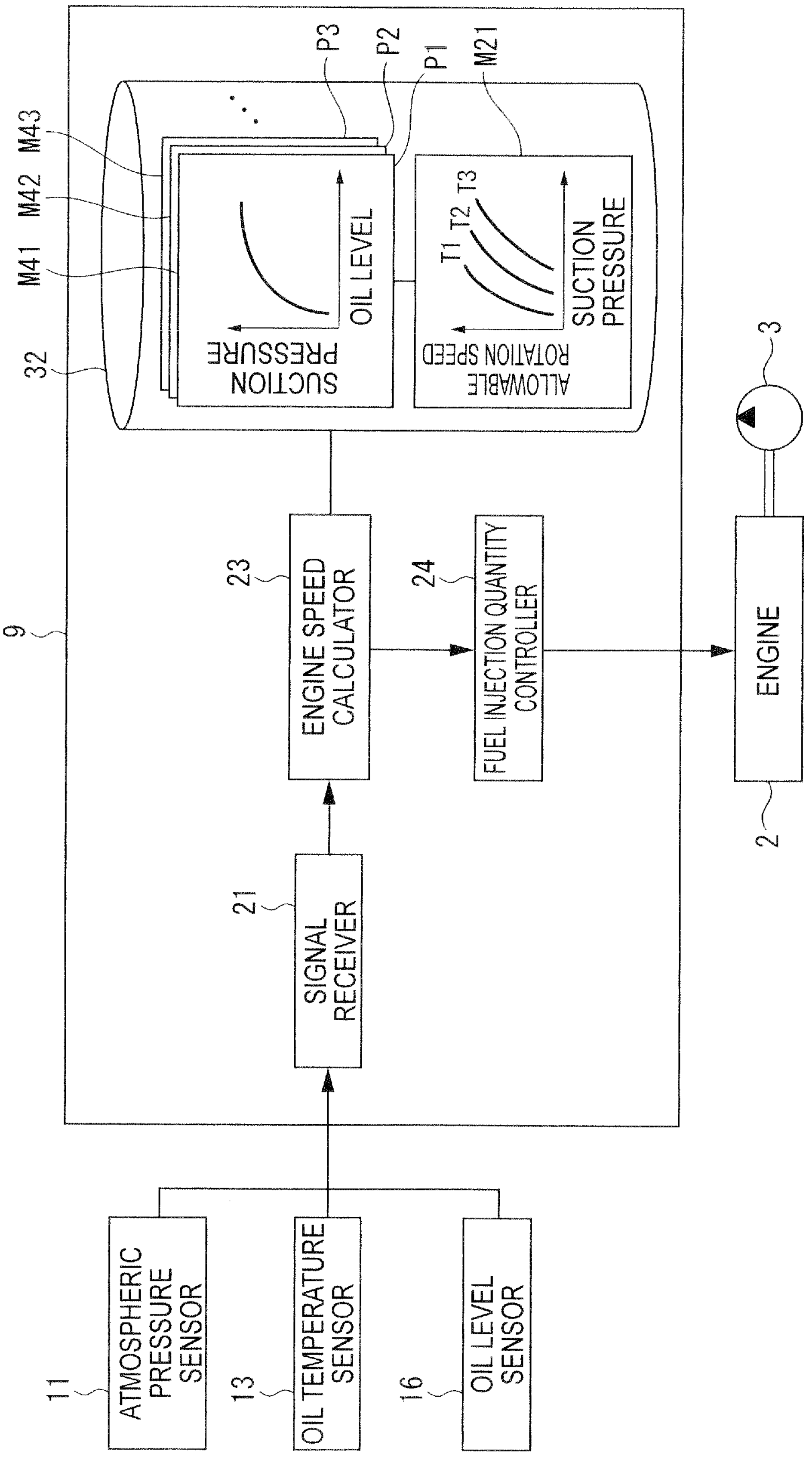
FIG. 17 is a block diagram according to the sixth exemplary embodiment.
Figure 18:
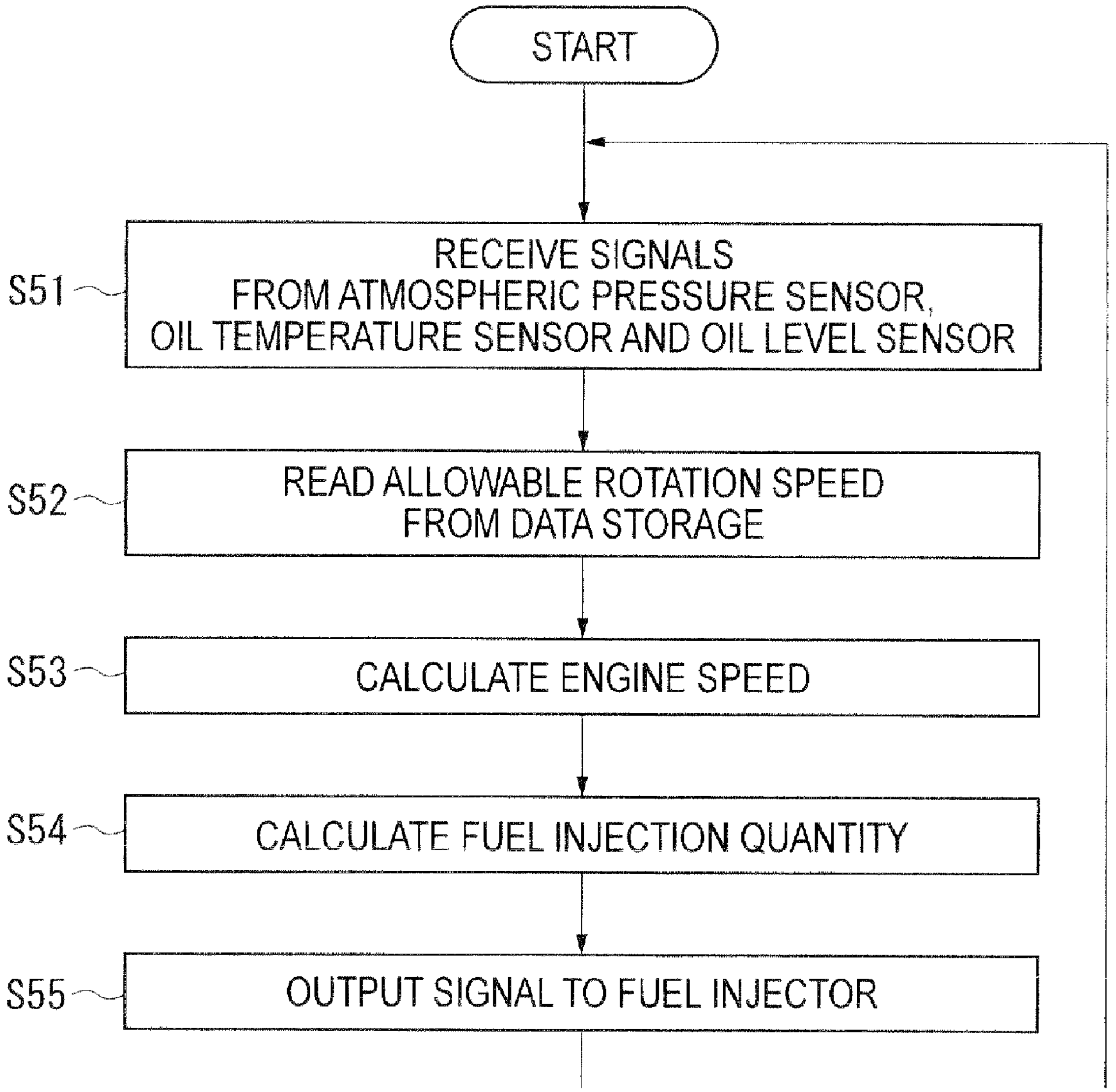
FIG. 18 is a flowchart according to the sixth exemplary embodiment.

In the sixth exemplary embodiment of the invention as shown in FIGS. 16 to 18, atmospheric pressure, temperature of the hydraulic oil, and an oil level in the hydraulic tank 4 are measured. Then, suction pressure of the hoist pump 3 is calculated to control the rotation speed of the hoist pump 3.

As shown in FIG. 16, the vehicle body 1 of the dump truck includes: an atmospheric pressure sensor 11 for measuring atmospheric pressure at workplace; the oil temperature sensor 13 for measuring temperature of the hydraulic oil in the hydraulic tank 4; and an oil level sensor 16 for measuring an oil level in the hydraulic tank 4.

In the block diagram shown in FIG. 17, the signal receiver 21 of the sixth exemplary embodiment receives an atmospheric pressure measurement signal outputted from the atmospheric pressure sensor 11, an oil temperature measurement signal of the hydraulic oil in the tank outputted from the oil temperature sensor 13, and an oil level position measurement signal of the hydraulic tank 4 outputted from the oil sensor 16.

In particular, the signal receiver 21 receives the signals from the atmospheric pressure sensor 11, oil temperature sensor 13 and oil level sensor 16.

The data storage 32 preliminarily stores maps M41, M42, M43, . . . of suction pressure determined by the oil level for every atmospheric pressure P1, P2, P3 . . . , and further stores the map M21 of the allowable rotation speed of the hoist pump 3 determined by the suction pressure and oil temperatures T1, T2, T3, . . . .

A flow of the above-described system will be described below with reference to FIG. 18.

The atmospheric pressure sensor 11 measures atmospheric pressure at workplace, the oil temperature sensor 13 measures oil temperature of hydraulic oil, and the oil level sensor 16 measures an oil level within the hydraulic oil tank 4. Then, the oil temperature measurement signal, the suction pressure measurement signal and the oil level measurement signal are outputted to the controller 9, so that the signal receiver 21 receives the signals (S51).

The engine speed calculator 23 selects an atmospheric pressure in accordance with the atmospheric pressure signal outputted from the atmospheric pressure sensor 11 out of the atmospheric pressures P1, P2. P3, . . . stored in the data storage 32 to read one of the maps M41, M42, M43 . . . . Subsequently, the engine speed calculator 23 determines a suction pressure depending on the oil level in accordance with the oil level measurement signal received from the oil level sensor 16 and the selected one of the maps M41, M42, M43, . . . . Further, with reference to the map M21 of the allowable rotation speed determined by the suction pressure and the oil temperatures T1. T2. T3, . . . , the engine speed calculator 23 reads an allowable rotation speed of the hoist pump 3 (S52) and calculates an engine speed (S53).

Subsequently, the fuel injection quantity controller 24 calculates fuel injection quantity in accordance with the calculated engine speed (S54) and outputs a signal to the fuel injector (not shown) provided on the engine 2 (S55). Thus, the engine 2 drives the hoist pump 3 at the allowable rotation speed.

In the sixth exemplary embodiment, the rotation speed of the hoist pump 3 is controlled so that the same advantages as those of the first and fourth exemplary embodiments can be attained. Also, due to the oil level sensor 16, the suction pressure of the hoist pump 3 can be calculated from the oil level even when a space for the discharge pressure sensor and suction pressure sensor is not provided because of an arrangement of the system. Thus, the rotation speed can be more preciously calculated to prevent cavitation.

It should be noted that the invention is not limited to the exemplary embodiments described above, and may be modified or improved as long as an object of the invention can be achieved. The invention also includes modifications as described below.

For example, the invention can be applicable to construction machines such as wheel loaders and hydraulic excavators, in addition to dump trucks. At this time, a tilt cylinder, boom cylinder, arm cylinder, bucket cylinder or the like is used as a hydraulic cylinder expandable by hydraulic oil delivered through a hoist pump.

Figure 19:
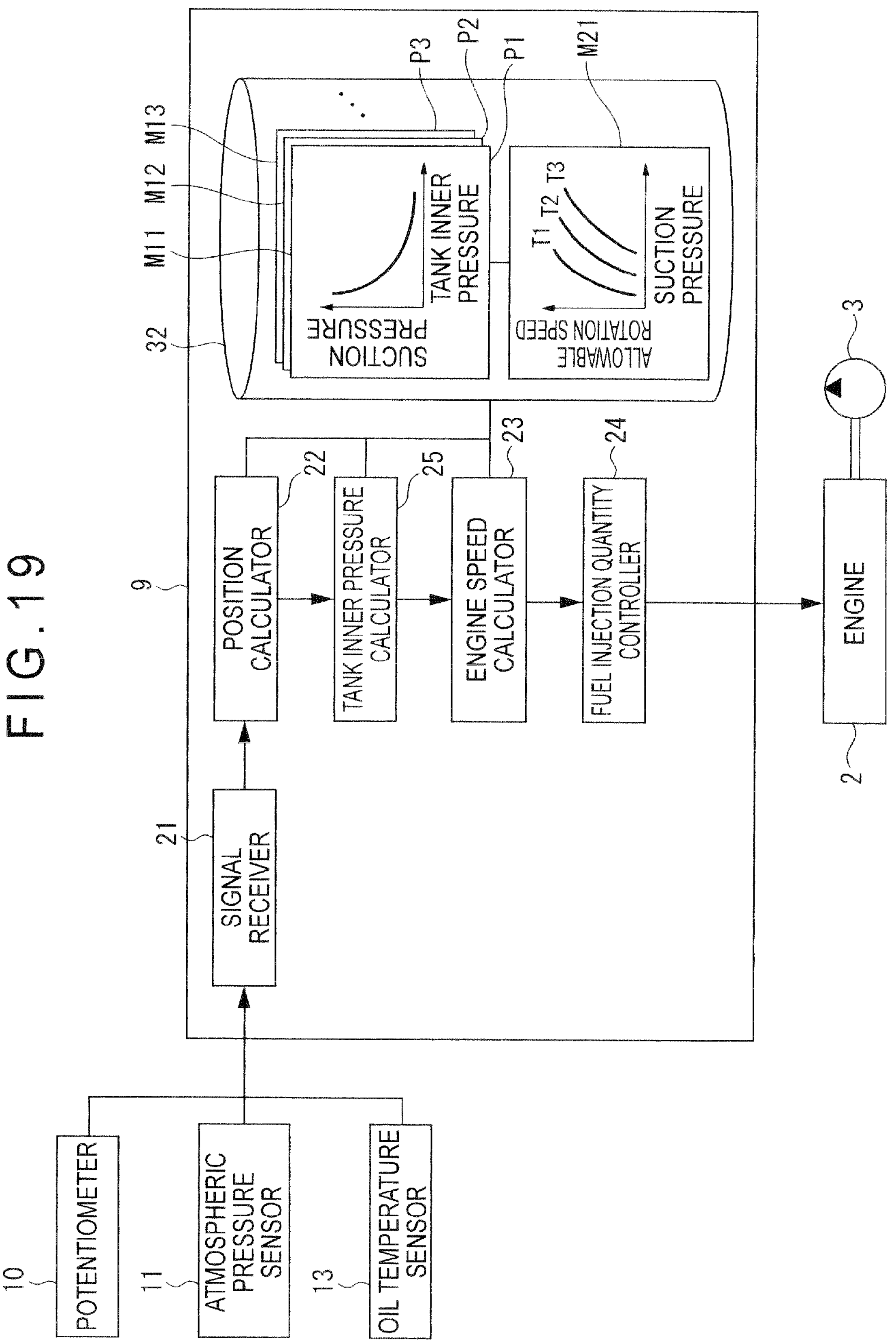
FIG. 19 is a block diagram according to a modification of the invention.

Also, as shown in FIG. 19, the rotation speed of the hoist pump 3 may be controlled in accordance with the change in the atmospheric pressure measured by the atmospheric pressure sensor 11 and the change in the oil temperature measured by the oil temperature 13, in addition to the arrangement of the third exemplary embodiment. In other words, a tank inner pressure calculator 25 may calculate an inner pressure of the hydraulic oil tank 4 from the position of the body 5 calculated by the position calculator 22 to calculate a suction pressure in accordance with the inner pressure and an allowable rotation speed depending on the oil temperature in accordance with the suction pressure.

Further, in the fourth exemplary embodiment, the suction pressure is calculated from the discharge pressure from the map M31 to calculate the allowable rotation speed from the suction pressure using M21. However, a map for directly calculating the allowable rotation speed from the discharge pressure may be used. Similarly, as a modification of the sixth exemplary embodiment, a map for directly calculating the allowable rotation speed from the oil level in the hydraulic oil tank 4 may be used.

The invention claimed is:

1. A rotation control system of a hoist pump, the system comprising:
- the hoist pump;
- an engine that drives the hoist pump;
- a working equipment driven by a hydraulic cylinder that is extended and retracted by hydraulic oil delivered through the hoist pump;
- a hydraulic oil tank that stores the hydraulic oil supplied to the hoist pump and receives the hydraulic oil returned from the hydraulic cylinder;
- a detector that detects an operation condition of the hydraulic cylinder; and
- a controller that controls a rotation speed of the hoist pump to be an allowable rotation speed, wherein when the operation condition detected by the detector indicates lowered pressure in the hydraulic oil tank, the controller controls the rotation speed of the hoist pump to be an allowable rotation speed for preventing cavitation that is lower than an allowable rotation speed of the hoist pump when the operation condition detected by the detector does not indicate lowered pressure in the hydraulic oil tank.

2. The rotation control system of the hoist pump according to claim 1, wherein:
- the detector comprises a potentiometer that measures an operation position of the working equipment, and
- the controller comprises:
  - an engine speed calculator that calculates an engine speed in accordance with the allowable rotation speed of the hoist pump, which is determined based on a position measurement signal outputted from the potentiometer; and
  - a fuel injection quantity controller that controls a fuel injection quantity in accordance with the engine speed calculated by the engine speed calculator.

3. The rotation control system of the hoist pump according to claim 2, further comprising:
- an atmospheric pressure sensor that measures an atmospheric pressure; and
- an oil temperature sensor that measures a temperature of the hydraulic oil,
- wherein the controller determines the allowable rotation speed based on the atmospheric pressure an measured by the atmospheric pressure sensor, the temperature measured by the oil temperature sensor, and the position measurement signal from the potentiometer.

4. The rotation control system of the hoist pump according to claim 1, further comprising:
- a working equipment lever that is operable to output an operation signal corresponding to a lift-up operation or a lift-down operation of the working equipment,
- wherein the controller comprises:
  - a signal receiver as the detector, wherein the signal receiver receives the operation signal from the working equipment lever;
  - an engine speed calculator that calculates an engine speed in accordance with the allowable rotation speed of the hoist pump, which is determined based on the operation signal received by the signal receiver; and
  - a fuel injection quantity controller that controls a fuel injection quantity in accordance with the engine speed calculated by the engine speed calculator.

5. The rotation control system of the hoist pump according to claim 1, wherein:
- the detector comprises a position sensor that detects whether the working equipment is in a predetermined position or not, and
- the controller comprises:
  - a signal receiver that receives a detection signal from the position sensor;
  - an engine speed calculator that calculates an engine speed in accordance with the allowable rotation speed of the hoist pump, which is determined based on the detection signal outputted from the signal receiver; and a fuel injection quantity controller that controls a fuel injection quantity in accordance with the engine speed calculated by the engine speed calculator.

6. The rotation control system of the hoist pump according to claim 1, further comprising:

an atmospheric pressure sensor that measures an atmospheric pressure; and an oil temperature sensor that measures a temperature of the hydraulic oil;

wherein the detector comprises an oil level sensor that measures an oil level in the hydraulic tank, and wherein the controller comprises:

an engine speed calculator that calculates an engine speed in accordance with the allowable rotation speed of the hoist pump, which is determined based on the atmospheric pressure measured by the atmospheric pressure sensor, the temperature measured by the oil temperature sensor, and an oil level measurement signal outputted from the oil level sensor; and a fuel injection quantity controller that controls a fuel injection quantity in accordance with the engine speed calculated by the engine speed calculator.

* * * * *